(12) United States Patent  
Miyazawa et al.

(10) Patent No.: US 7,926,957 B2  
(45) Date of Patent: Apr. 19, 2011

(54) MULTI-PROJECTION DISPLAY

(75) Inventors: Yasunaga Miyazawa, Okaya (JP); Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 50 days.

(21) Appl. No.: 12/504,111

(22) Filed: Jul. 16, 2009

(65) Prior Publication Data

US 2009/0279001 A1 Nov. 12, 2009

Related U.S. Application Data

(62) Division of application No. 10/962,878, filed on Oct. 13, 2004, now abandoned.

(30) Foreign Application Priority Data

Oct. 15, 2003 (JP) .................................. 2003-355250

(51) Int. Cl.  
*G03B 21/26* (2006.01)  
*H04N 3/22* (2006.01)  
*H04N 3/12* (2006.01)

(52) U.S. Cl. .............. 353/94; 353/69; 353/85; 348/745; 348/798

(58) Field of Classification Search .................... 353/94, 353/69, 70, 85; 348/745, 798, 799  
See application file for complete search history.

(56) References Cited

U.S. PATENT DOCUMENTS

| | | | |
|---|---|---|---|
| 5,956,000 A | 9/1999 | Kreitman et al. | |
| 6,017,123 A * | 1/2000 | Bleha et al. ....................... | 353/30 |
| 6,050,690 A | 4/2000 | Shaffer et al. | |
| 6,222,593 B1 * | 4/2001 | Higurashi et al. ............. | 348/745 |
| 6,224,216 B1 | 5/2001 | Parker et al. | |
| 6,456,339 B1 | 9/2002 | Surati et al. | |
| 6,558,006 B2 | 5/2003 | Ioka | |
| 6,561,651 B1 * | 5/2003 | Kubota et al. ................... | 353/30 |
| 6,592,228 B1 | 7/2003 | Kawashima et al. | |
| 6,674,415 B2 | 1/2004 | Nakamura et al. | |
| 6,695,451 B1 | 2/2004 | Yamasaki et al. | |
| 6,733,138 B2 | 5/2004 | Raskar | |
| 6,749,310 B2 | 6/2004 | Pohlert et al. | |

(Continued)

FOREIGN PATENT DOCUMENTS

CN  1404699 A  3/2003

(Continued)

OTHER PUBLICATIONS

Taiichiro Kurita, "Picture Quality of Moving Pictures in Hold-Type Displays", Technical Report of IEICE, EID-99-10 Jun. 1999, pp. 55-60, and English Translation.

*Primary Examiner* — Georgia Y Epps  
*Assistant Examiner* — Magda Cruz  
(74) *Attorney, Agent, or Firm* — Oliff & Berridge, PLC

(57) ABSTRACT

A multi projection display includes a plurality of projector units to modulate light from an LED light source according to image information to project, a unit image information generating unit to generate unit image information to be inputted to each of the plurality of projector units, and a unit image information correcting unit to correct the unit image information based on a result of capturing projection images projected onto a transmissive screen. For this reason, a shutter, which results in complicating the construction, is not needed and further it is possible to further reduce the adjustment time.

16 Claims, 25 Drawing Sheets

U.S. PATENT DOCUMENTS

| | | |
|---|---|---|
| 6,771,307 B2 * | 8/2004 | Waki et al. .................... 348/189 |
| 6,781,563 B2 * | 8/2004 | Nishio et al. .................... 345/1.1 |
| 7,106,350 B2 | 9/2006 | Baba et al. |
| 2001/0024326 A1 | 9/2001 | Nakamura et al. |
| 2002/0024640 A1 | 2/2002 | Ioka |
| 2003/0206179 A1 | 11/2003 | Deering |
| 2003/0214633 A1 | 11/2003 | Roddy et al. |
| 2004/0207821 A1 * | 10/2004 | Roddy et al. .................... 353/94 |

FOREIGN PATENT DOCUMENTS

| | | |
|---|---|---|
| EP | 1 039 749 A1 | 9/2000 |
| JP | A-06-178327 | 6/1994 |
| JP | A-08-082854 | 3/1996 |
| JP | A-08-094974 | 4/1996 |
| JP | A-09-211386 | 8/1997 |
| JP | A-09-326981 | 12/1997 |
| JP | A-2001-215642 | 8/2001 |
| JP | A-2001-251651 | 9/2001 |
| JP | A-2001-265275 | 9/2001 |
| JP | A-2001-339672 | 12/2001 |
| JP | A-2002-41002 | 2/2002 |
| JP | A-2002-311502 | 10/2002 |
| WO | WO 99/31877 | 6/1999 |
| WO | WO 00/18139 A1 | 3/2000 |

* cited by examiner

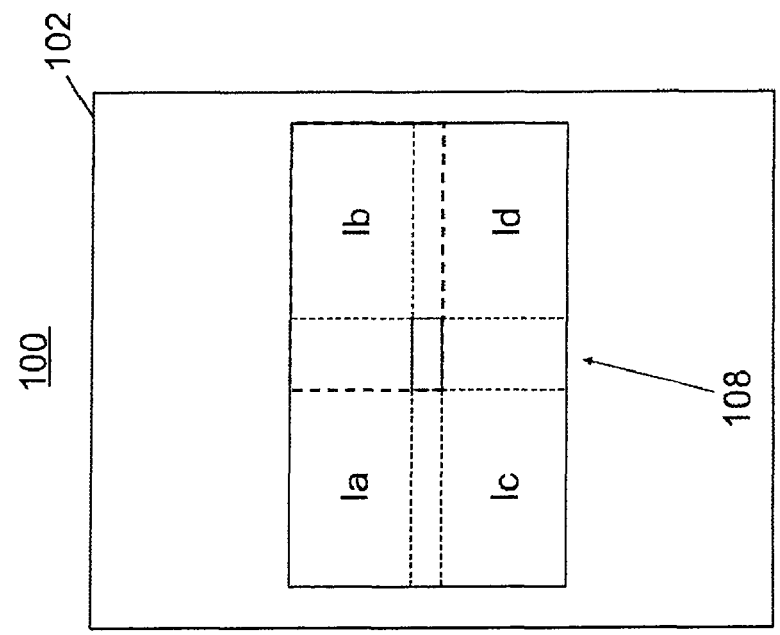
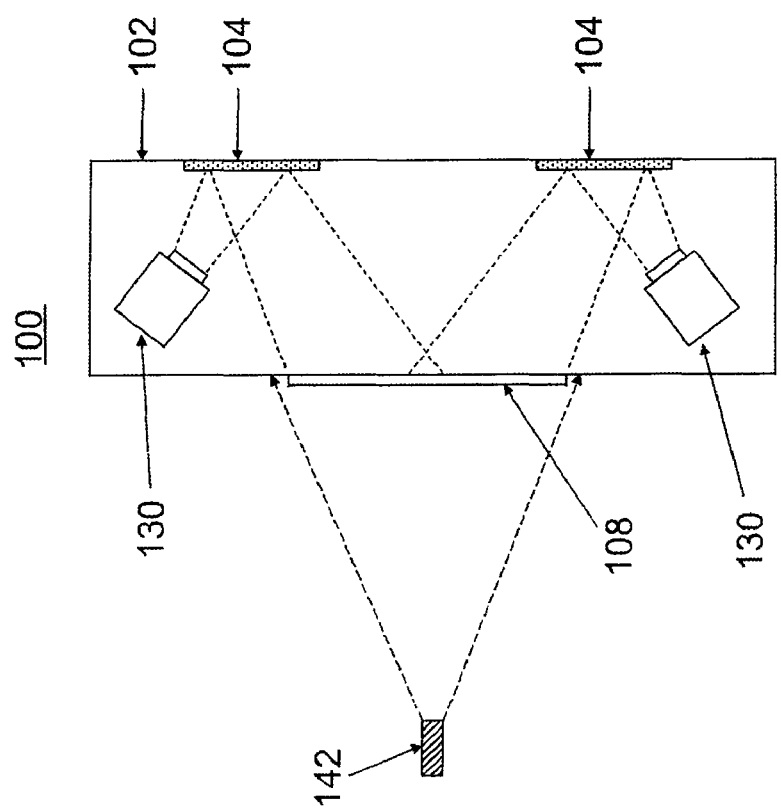

FIG. 12A
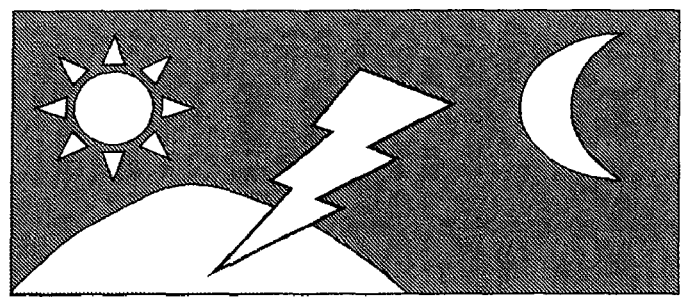
(ORIGINAL IMAGE)
FIG. 12B
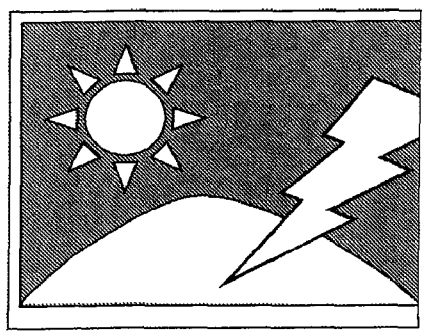 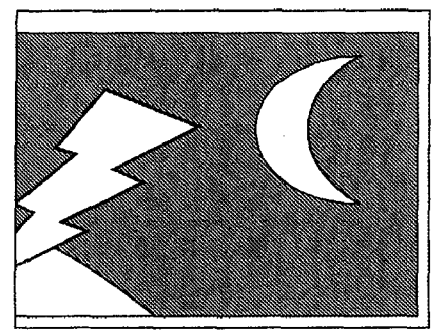
(ALLOCATION OF IMAGE TO $PJU_a$)  (ALLOCATION OF IMAGE TO $PJU_b$)
FIG. 12C
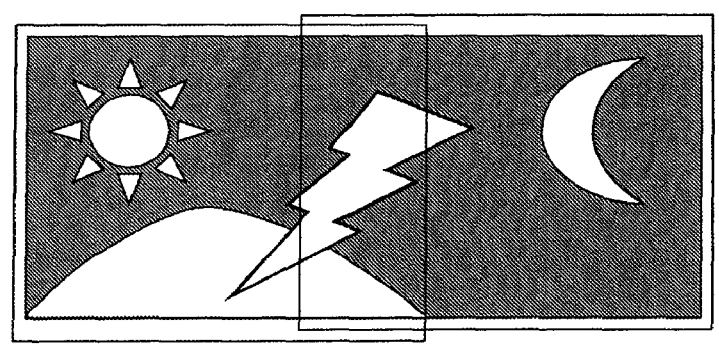
(IMAGE PROJECTED BY TWO PROJECTOR UNITS $PJU_a$ AND $PJU_b$)

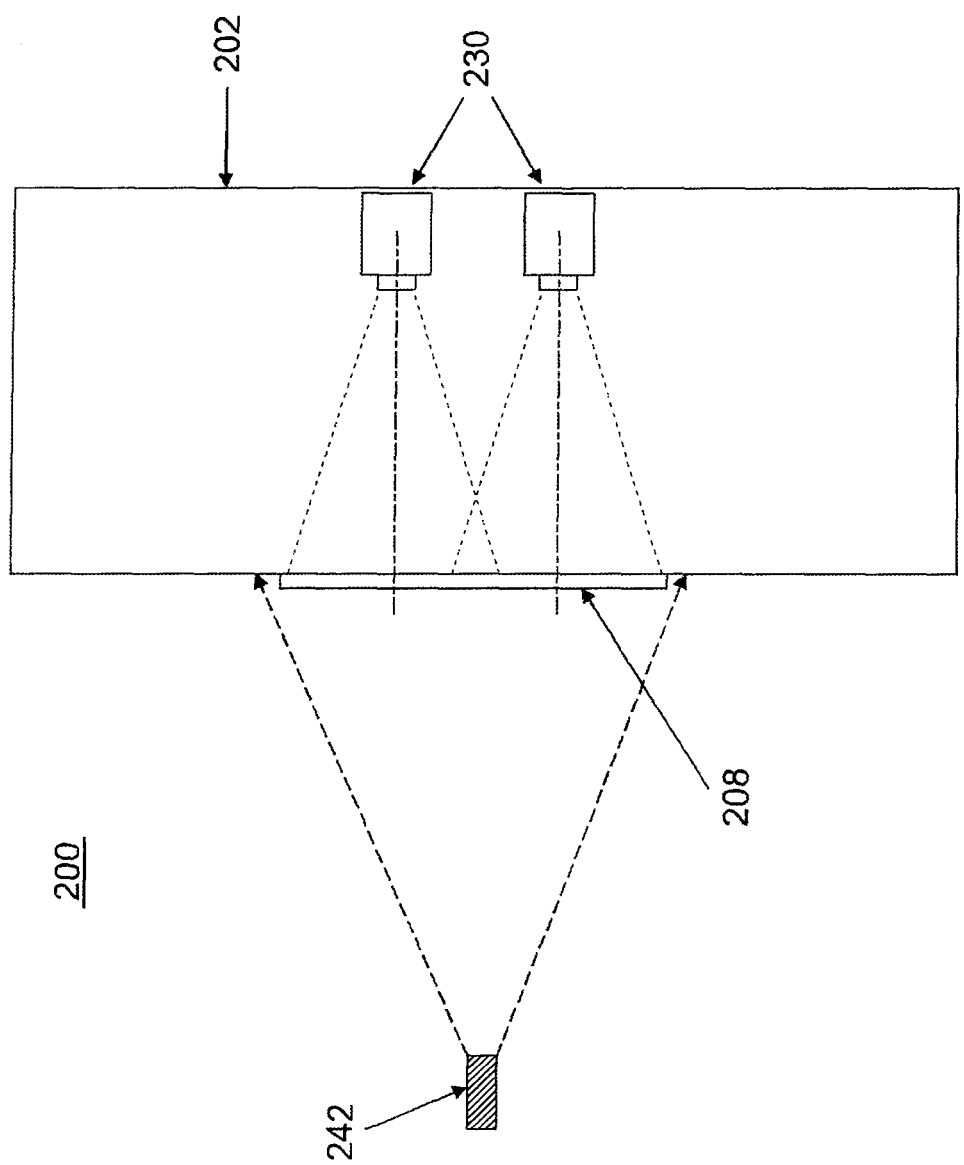

FIG. 16A (TRAPEZOIDAL DISTORTION)
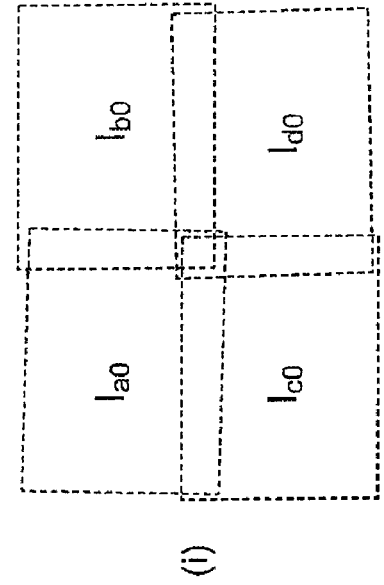
(i)
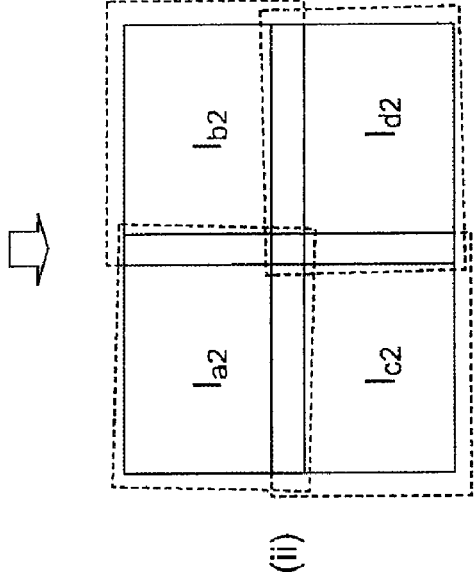
(ii)
FIG. 16B (NO TRAPEZOIDAL DISTORTION)
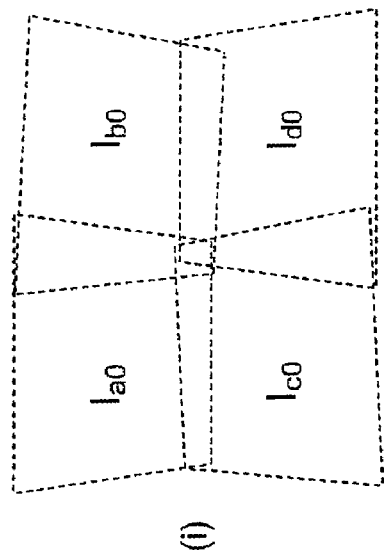
(i)
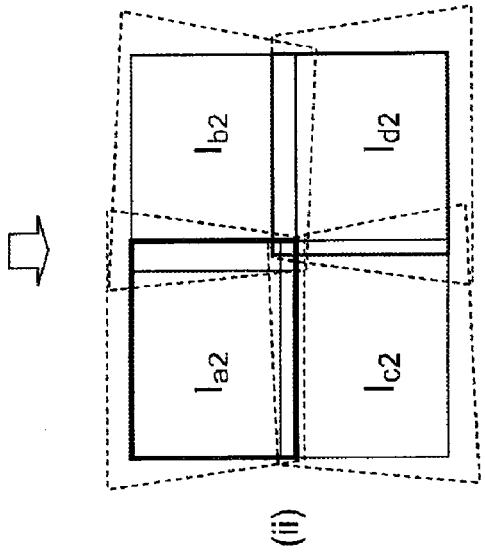
(ii)

FIG. 18B

| Ia<br>RELATIVE LIGHTNESS<br>BEFORE ADJUSTING: 100%<br>ADJUSTED AMOUNT OF<br>LIGHT: 10%<br>RELATIVE LIGHTNESS<br>AFTER ADJUSTING: 90% | Ib<br>RELATIVE LIGHTNESS<br>BEFORE ADJUSTING: 95%<br>ADJUSTED AMOUNT OF<br>LIGHT: 5%<br>RELATIVE LIGHTNESS<br>AFTER ADJUSTING: 90% |
|---|---|
| Ic<br>RELATIVE LIGHTNESS<br>BEFORE ADJUSTING: 90%<br>ADJUSTED AMOUNT OF<br>LIGHT: 0%<br>RELATIVE LIGHTNESS<br>AFTER ADJUSTING: 90% | Id<br>RELATIVE LIGHTNESS<br>BEFORE ADJUSTING: 95%<br>ADJUSTED AMOUNT OF<br>LIGHT: 5%<br>RELATIVE LIGHTNESS<br>AFTER ADJUSTING: 90% |

| Ia<br>RELATIVE LIGHTNESS<br>BEFORE ADJUSTING: 100% | Ib<br>RELATIVE LIGHTNESS<br>BEFORE ADJUSTING: 95% |
|---|---|
| Ic<br>RELATIVE LIGHTNESS<br>BEFORE ADJUSTING: 90% | Id<br>RELATIVE LIGHTNESS<br>BEFORE ADJUSTING: 95% |

100
108

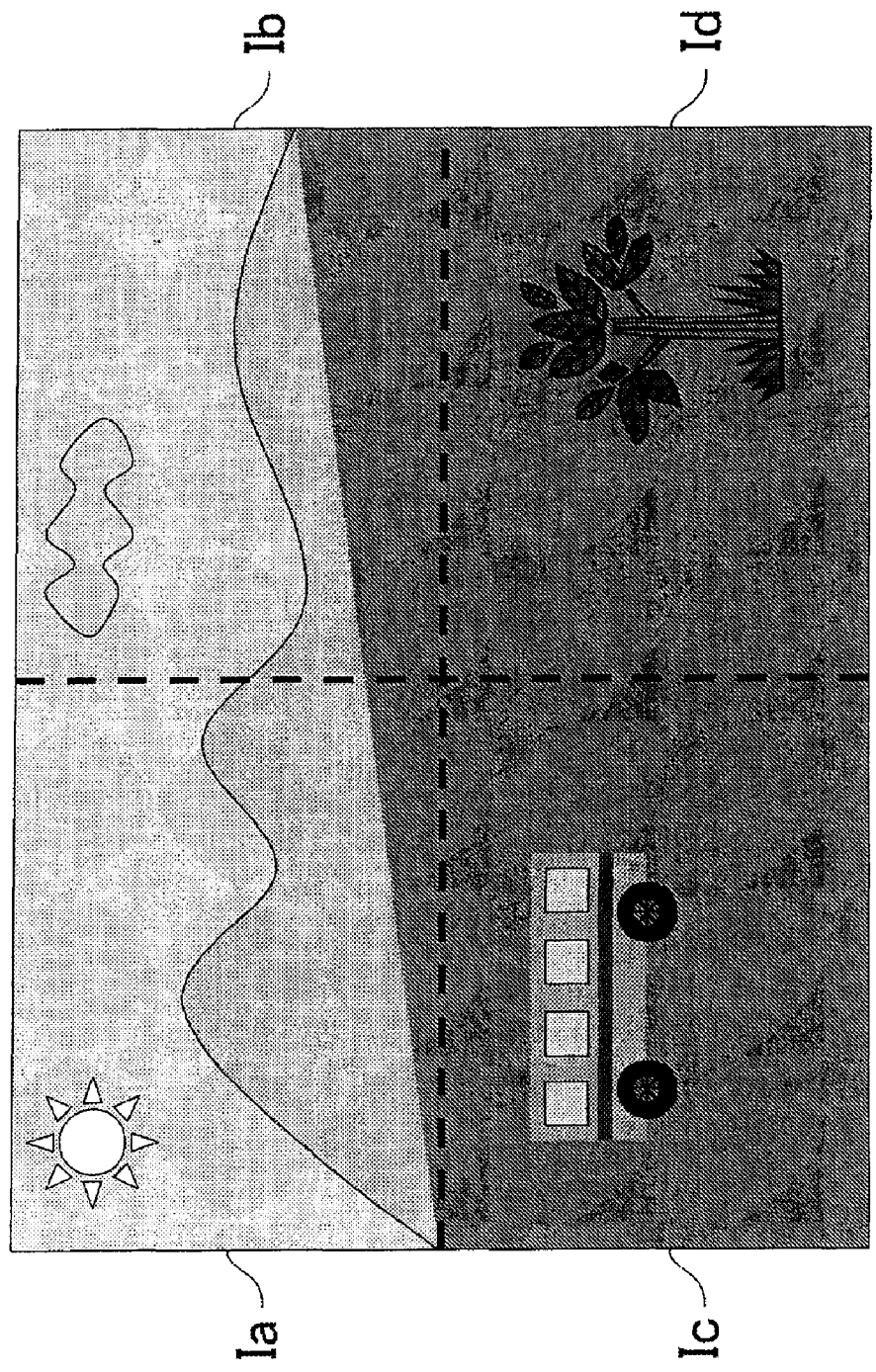
FIG. 21 FOUR-DIVIDED IMAGE

MULTI-PROJECTION DISPLAY

This is a Division of application Ser. No. 10/962,878 filed Oct. 13, 2004, which claims the benefit of Japanese Patent Application Publication No. 2003-355250 filed Oct. 15, 2003. The disclosures of the prior applications are hereby incorporated by reference herein in their entirety.

BACKGROUND OF THE INVENTION

1. Field of Invention

Exemplary aspects of the present invention relate to a multi-projection display.

2. Description of Related Art

A related art multi-projection display includes a plurality of projector units (projection optical unit) that are arranged in a horizontal direction and in a vertical direction, and projection images from the plurality of projector units are projected onto a screen in a magnified scale to display one large screen image. For example, see Japanese Unexamined Patent Application Publication No. 8-82854, Japanese Unexamined Patent Application Publication No. 8-94974, Japanese Unexamined Patent Application Publication No. 2001-339672, International Publication Pamphlet No. 99/31877, Japanese Unexamined Patent Application Publication No. 9-326981, Japanese Unexamined Patent Application Publication No. 2001-251651, Japanese Unexamined Patent Application Publication No. 6-178327, Japanese Unexamined Patent Application Publication No. 9-211386, and U.S. Pat. No. 5,956,000. Such a multi-projection display can display a high definition and high brightness image, as compared to other related art projectors. Thus, it is expected that the multi-projection display will be widely used in future in a business field, such as a cinema, an art gallery, a museum, a seminar hall, an assembly hall, a mini-theater, a public institute, and a company or in a domestic field, such as an amusement and a home theater.

SUMMARY OF THE INVENTION

In these related art multi-projection displays, if the projection images from the respective projector units are not smoothly connected to each other, it is impossible to match the projection images from the respective projector units. Further, a boundary is noticeable, and image quality is lowered.

For this reason, in the related art multi-projection display disclosed in Japanese Unexamined Patent Application Publication No. 8-82854 and Japanese Unexamined Patent Application Publication No. 8-94974, in order to address the above problem, the projection images from the respective projector units are made not to overlap each other and the joint portions thereof become small.

However, in such related art multi-projection displays, there is a problem in that at the time of setting up, it is not easy to remove joint portions of the projection images from the respective projector units or connect the projection images without inconsistency.

For this reason, in the related art multi-projection display disclosed in Japanese Unexamined Patent Application Publication No. 2001-339672, International Publication Pamphlet No. 99/31877, Japanese Unexamined Patent Application Publication No. 9-326981, Japanese Unexamined Patent Application Publication No. 2001-251651, Japanese Unexamined Patent Application Publication No. 6-178327, Japanese Unexamined Patent Application Publication No. 9-211386, and U.S. Pat. No. 5,956,000 in order to address the above problem, the projection images from adjacent projector units are made to overlap partially on the screen such that the projection images are smoothly connected to each other in the overlapped region.

However, in such related art multi-projection displays, if the method of displaying the projection images from the respective projector units on the screen are not accurately known, it is impossible to smoothly connect the projection images on the screen. Thus, when the related art multi-projection display disclosed in Japanese Unexamined Patent Application Publication No. 2001-339672, International Publication Pamphlet No. 99/31877, Japanese Unexamined Patent Application Publication No. 9-326981, and Japanese Unexamined Patent Application Publication No. 2001-251651, is used with a watch camera or a digital camera, the projection images (Adjusting images) from the respective projector units which are displayed on the screen are captured and can be accurately measured.

In the related art multi-projection display using these image-capturing devices, in order to perform the adjustment to match the projection images from the respective projector units, there is a need to prevent influence of the projection image by an adjacent projector unit. For this reason, the capturing operation to the adjusting image needs to be performed for every projector unit.

However, since a light emitting tube having high brightness and high color-rendering property, such as a high pressure mercury lamp or a metal halide lamp, is typically used as a light source of the projector unit, after the light emitting tube is turned on, obtaining a stable emitting state takes a minimum of several minutes.

For this reason, in the related art multi-projection display disclosed in Japanese Unexamined Patent Application Publication No. 2001-339672, shutters are arranged in front of the projection lenses of the respective projector units and these shutters are allowed to suitably operate. Thus, in the multi-projection display, the capturing operation for every projector unit is performed in a state in which the light emitting tube is turned on, such that the adjustment operation is performed in a few minutes.

However, in the related art multi-projection display disclosed in Japanese Unexamined Patent Application Publication No. 2001-339672, in order to perform the adjustment to match the projection images from the respective projector units to each other, the shutter must be operated mechanically for every projector unit. Thus, there are problems in that the system becomes complicated and the adjustment time is not easily reduced.

Accordingly, exemplary aspects of the present invention are made to address and/or solve the above and/or other problems. Exemplary aspects of the present invention provide a multi-projection display which can further shorten the adjustment time with no shutter required to match projection images from the respective projector units.

The present inventors have studied to attain the above and discovered that the above can be attained by using a solid-state light source as a light source of the multi-projection display and by performing an adjustment operation using light from the solid-state light source, thereby completing the present invention.

(1) A multi-projection display of an exemplary aspect of the present invention includes a plurality of projector units to modulate light from a solid-state light source based on image information, a unit image information generating unit to generate image information (Hereinafter, "unit image information") to be input to each of the plurality of projector units, and a unit image information correcting unit to correct the unit image information based on a result of capturing projection images projected onto a screen.

For this reason, according to the multi-projection display of an exemplary aspect of the present invention, instead of a high pressure mercury lamp or a metal halide lamp which has high brightness, but takes several minutes until its emitting state is stable after being turned on, a solid-state light source that acquires a stable emitting state immediately after turning on is used. Thus, it is possible to drastically shorten the time required to capture the projection images to be projected from the respective projector units onto the screen. As a result, it is possible to drastically shorten the adjustment time to match the projection images from the respective projector units. Thus convenience is largely enhanced.

Further, according to the multi-projection display of an exemplary aspect of the present invention, the solid-state light source can be freely set to a turned-on state or a turned-off state. Thus it is possible to remove the shutter which complicates the system. Since the solid-state light source is in the stable emitting state immediately after being turned on, it is possible to begin capturing at once.

(2) In the multi-projection display according to an exemplary aspect of the invention (1), the solid-state light source may be an LED light source, a semiconductor laser light source, a solid-state laser light source, or an EL light source.

Thus, a multi-projection display in which is easy to adjust since the stable turned-on state is acquired at once and which has sufficient brightness and color-rendering property is acquired.

(3) In the multi-projection display according to exemplary aspects of the invention (1) or (2), the unit image information correcting unit may correct the unit image information based on a result of capturing adjusting unit images projected by the projector units.

The unit image information correcting unit may perform the correction of the unit image information based on a capturing result of a related art image. However, by correcting the unit image information based on the result of capturing the adjusting unit image, it is possible to perform the more accurate correction rapidly.

As the adjusting unit image, various unit images suitable to perform the correction of the unit image information, such as a beta image of white or monochrome, a lattice shape of monochrome, may be used.

In this case, it may be constructed such that the adjusting image information is previously stored in the multi-projection display and the unit image information generating unit generates the adjusting unit image using the adjusting image information at the time of the adjustment operation. In addition, the adjusting unit image information may be previously stored in the multi-projection display and at the time of the adjustment operation, the adjusting unit image information may be used as it is.

Further, when the adjustment operation is performed, the adjusting image information may be input to the multi-projection display (a DVD or the like) and the unit image information generating unit may generate the adjusting unit image information using the adjusting image information. Further, when the adjustment operation is performed, the adjusting unit image information may be input directly to the multi-projection display.

(4) In the multi-projection display according to any exemplary aspect of the invention (1) to (3), the unit image information correcting unit may correct shapes, positions and/or inclinations of unit images to be projected by the projector units.

If doing so, the shapes, the positions and/or the inclinations of the projection images from the respective projector units become proper. Thus it is possible to highly match the projection images from the respective projector units.

(5) In the multi-projection display according to any one of the exemplary aspects of the invention (1) to (3), the unit image information correcting unit may correct the brightness and/or colors of unit images to be projected by the projector units.

If doing so, the brightness and/or colors of the projection images from the respective projector units become proper. Thus it is possible to highly match the projection images from the respective projector units.

(6) In the multi-projection display according to any one of the exemplary aspects of the invention (1) to (5), the unit image information correcting unit may have a function of correcting the brightness and/or color for every pixel in the plurality of projector units.

If doing so, it is possible to further match the projection images from the respective projector units, and thus it is possible to project images true to original image information.

In this case, the unit image information correcting unit may have a function of correcting the unit image to the brightness and/or color for every pixel in the respective projector units by comparing the adjusting image, which is formed by a plurality of adjusting unit images to be projected by the plurality of projector units, as a whole and an original adjusting image.

(7) In the multi-projection display according to any one of the exemplary aspects of the invention (1) to (6), the display may include an image-capturing device for capturing the projection images projected onto the screen.

If doing so, it is possible to shorten the time required for capturing. Thus it is possible to drastically shorten the adjustment operation time to match the projection images from the respective projector units.

(8) In the multi-projection display according to any one of the exemplary aspects of the invention (1) to (7), the unit image information correcting unit may correct the unit image information using correction parameters that are determined based on the capturing result.

If doing so, after the correction parameters are determined once based on the capturing result, it is possible to easily correct the unit image information using the correction parameters.

(9) In the multi-projection display according to an exemplary aspect of the invention (8), the display may include a correction parameter storing unit to store the correction parameters.

If doing so, it is possible to make the required storage capacity smaller than when storing the capturing result itself. Further, it is possible to make the calculation quantities, when correcting the unit image information, small.

(10) In the multi-projection display according to exemplary aspects of the invention (8) or (9), the display may include a correction parameter automatic acquiring device to capture an adjusting image in certain circumstances to automatically acquire the correction parameters.

If doing so, for example, when the correction parameters are needed to be determined again (Acquired again.) For example, three months lapse after acquiring again), the correction parameter automatic acquiring device may operate automatically to acquire the correction parameters again. Further, when a regular time comes (For example, at 4 a.m.), the correction parameter automatic acquiring device may operate automatically to acquire the correction parameters again.

Thus, without troubling the user, it is possible to maintain smooth image quality, and further convenience is enhanced.

Further, even though the characteristics of the light source or the electro-optical modulating device are changed by variation per hour, the correction parameters corresponding to the change in characteristic can be automatically acquired. Thus, it is possible to constantly suppress deterioration of image quality due to the variation per hour.

(11) In the multi-projection display according to any one of the exemplary aspects of the invention (1) to (10), the display may include an optical correcting device to correct the position and/or orientation of an optical element provided in the multi-projection display.

If doing so, after the position and/or orientation of the optical element is corrected once, smooth image quality is acquired. Since the correction is optically performed, there is no deterioration of image quality due to the adjustment operation.

In this case, after the optical correction to the position and/or orientation of the optical element is first performed, the capturing by the image-capturing device may be performed again. Then the correction parameters are determined based on the capturing result.

If doing so, after optically performing the large scale correction first, it is possible to perform the minute correction purely electronically. Further, it is possible to suppress deterioration of image quality to be generated when the unit image information correcting unit corrects the unit image information to a minimum.

(12) In the multi-projection display according to exemplary aspect of the invention (11), the display may include an optical element automatic correcting device to capture an adjusting image in certain circumstances to automatically correct the position and/or orientation of the optical element.

If doing so, for example, when the correction parameters are needed to be determined again (Acquired again.) (For example, three months lapse after acquiring again) or when the regular time comes every day (For example, at 4 a.m.), the correction parameter automatic acquiring device may operate automatically to correct the position and/or orientation of the optical element. Thus, without troubling the user, it is possible to maintain smooth image quality, and further convenience is enhanced.

(13) In the multi-projection display according to any one of the exemplary aspects of the invention (1) to (12), the display may include a solid-state light source control unit to control the amount of light emitted from the solid-state light source separately for every projector unit.

In the multi-projection display, generally, due to unevenness in characteristic in the light source or the electro-optical modulating device, it is the present situation that a brightness characteristic or a color characteristic for every projector unit is different. For this reason, in the multi-projection display, a voltage to be applied to the electro-optical modulating device for every projector unit is adjusted such that the difference of the brightness characteristics or the color characteristics is absorbed. As a result, in the multi-projection display, by performing the adjustment, the gradation source is needed to be used in the electro-optical modulating device, which results in problems in that the number of effective gradations inherent in the multi-projection display is lowered or the dynamic range becomes narrow.

According to the multi-projection display of an exemplary aspect of the invention (13), by controlling the amount of light emitted from the solid-state light source for every projector unit, it is possible to absorb the difference of the brightness characteristics or the color characteristics. For this reason, according to the multi-projection display of an exemplary aspect of the present invention, since there is no need to use the gradation source in the electro-optical modulating device, there is no case in which the number of effective gradations inherent in the multi-projection display is lowered or the dynamic range becomes narrow.

In this case, in order to absorb the difference of the brightness characteristic for every projector unit, in the projector units other than the projector unit having the lowest brightness level, the amount of light emitted from the solid-state light source may be lowered such that the brightness level in the projector units complies with the brightness level in the projector unit having the lowest brightness level.

Further, in order to absorb the difference of the color characteristic for every projector unit, the above-mentioned adjustment may be performed for every color light component.

Moreover, in the multi-projection display of the exemplary aspect of the invention (13), unlike a case in which the high pressure mercury lamp or the metal halide lamp is used as the light source, while the amount of emitted light decreases or increases as the voltage decreases or increase, the color temperature is not almost changed. Thus, there is no deterioration of image quality.

In the multi-projection display of the exemplary aspect of the invention (13), the solid-state light source control unit may have a function of controlling separately the voltage to be supplied to the solid-state light source for every projector unit.

If doing so, it is possible to easily increase or decrease the amount of light emitted from the solid-state light source for every projector unit.

In the multi-projection display of the exemplary aspect of the invention (13), the solid-state light source control unit may have a function of controlling separately the pulse width of alternating current (AC) power to be supplied to the solid-state light source for every projector unit.

If doing so, it is possible to easily increase or decrease the amount of light emitted from the solid-state light source for every projector unit.

(14) In the multi-projection display according to any one of the exemplary aspects of the invention (1) to (13), the multi-projection display may be a rear surface projection type multi-projection display which may include a transmissive screen to project the projection images from the plurality of projector units.

In this case, since it is possible to drastically shorten the above-mentioned adjustment time, it is possible to drastically shorten the time required for an assembling operation when the multi-projection display is assembled into the housing. Thus, it is possible to easily reduce the cost of the product. Further, when the maintenance of the multi-projection display is performed, it is possible to drastically shorten the time required for the maintenance operation. Thus convenience of the user is enhanced.

Moreover, in this case, the image-capturing device may be arranged in the housing of the multi-projection display.

If doing so, once if the image-capturing device is arranged surely in the housing of the rear surface projection type multi-projection display, there is no need to put the image-capturing device in order after the adjustment operation is completed. Thus, there is no need to set up the image-capturing device again when the projection image is captured. As a result, the adjustment operation becomes easy and the adjustment time is also shortened. Further, there are advantages that the image-capturing element can be easily set up at an accurate position to the transmissive screen, and the capturing of the projection image can be performed accurately and easily. In addition, there are advantages that the overall control unit to process the capturing result can be easily housed in the housing and the multi-projection display can be easily moved and set up.

(15) In the multi-projection display according to any one of the exemplary aspects of the invention (1) to (13), the multi-projection display may be a front surface projection type multi-projection display which projects the projection images from the projector units onto a front surface thereof.

In this case, since it is possible to drastically shorten the above-mentioned adjustment time, it becomes possible to drastically shorten the time required for the adjustment operation when the multi-projection display is set up.

The present inventors has discovered that by using the solid-state light source as the light source of the multi-projection display and by performing the adjustment operation using light from the solid-state light source, the above-mentioned and/or other advantages can be obtained. However, the present inventors has also discovered that by using the solid-state light source as the light source of the multi-projection display and by controlling the amount of light emitted from the solid-state light source for every projector unit, other excellent advantages can be obtained.

(16) Another multi-projection display of an exemplary aspect of the present invention includes a plurality of projector units, each having a solid-state light source to generate a plurality of color light components, a plurality of electro-optical modulating devices to modulate the plurality of color light components respectively, and a projection optical system to project color light components modulated by the plurality of electro-optical modulating devices, a unit image information generating unit to generate unit image information to be inputted to the plurality of projector units respectively, and a solid-state light source control unit to control the amount of light emitted from the solid-state light source for every projector unit.

For this reason, according to another multi-projection display of an exemplary aspect of the present invention, since it is possible to control separately the amount of light emitted from the solid-state light source for every projector unit, it is possible to absorb the difference of the brightness characteristic or the color characteristic for every projector unit by controlling the amount of light emitted from the solid-state light source. For this reason, since there is no need to use the gradation source in the electro-optical modulating device, there is no case in which the number of effective gradations inherent in the multi-projection display is lowered or the dynamic range becomes narrow.

In this case, in order to absorb the difference of the brightness characteristic for every projector unit, in the projector units other than the projector unit having the lowest brightness level, the amount of light emitted from the solid-state light source may be lowered such that the brightness level in the projector units complies with the brightness level in the projector unit having the lowest brightness level.

Moreover, in the multi-projection display of the exemplary aspect of the invention (16), unlike a case in which the high pressure mercury lamp or the metal halide lamp is used as the light source, while the amount of emitted light decreases or increases as the voltage decreases or increase, the color temperature is not almost changed. Thus, there is no deterioration of image quality.

(17) In the multi-projection display according to the exemplary aspect of the invention (16), the solid-state light source control unit may have a function of controlling the amount of light emitted from the solid-state light source for every electro-optical modulating device.

If doing so, it is also possible to absorb the difference of the color characteristic for every projector unit.

(18) In the multi-projection display according to the exemplary aspects of the invention (16) or (17), the solid-state light source control unit may have a function of dynamically controlling the amount of light emitted from the solid-state light source.

If doing so, in the case in which a totally dark screen is displayed (For example, a case in which a night scene in a movie is displayed), instead of or in addition to lowering the transmittance of the electro-optical modulating device, by decreasing the amount of light emitted from the solid-state light source, it is possible to make an entire screen dark. Further, in the case in which a totally bright screen is displayed (For example, a case in which an outdoor scene in the daytime in a movie is displayed), instead of or in addition to increasing the transmittance of the electro-optical modulating device, by increasing the amount of light emitted from the solid-state light source, it is possible to make the entire screen bright. For this reason, it is possible to increase the number of effective gradations or the dynamic range, which results in a high image quality multi-projection display having an excellent black level.

In this case, if the solid-state light source control unit is allowed to dynamically control the amount of light emitted from the solid-state light source, when an image in which a bright screen and a dark screen exist in one screen is displayed, it is possible for the multi-projection display to exhibit the expression ability exceeding the number of effective gradation or the dynamic range inherent in the multi-projection display. In addition, it is possible to perform high image quality display.

(19) In the multi-projection display according to any one of the exemplary aspects of the invention (16) to (18), the solid-state light source control unit may have a function of controlling a voltage to be supplied to the solid-state light source for every projector unit or for every electro-optical modulating device.

If doing so, it is possible to easily decrease or increase the amount of light emitted from the solid-state light source for every projector unit or for every electro-optical modulating device.

(20) In the multi-projection display according to any one of the exemplary aspects of the invention (16) to (18), the solid-state light source control unit may have a function of controlling an emitting period of the solid-state light source for every projector unit or for every electro-optical modulating device.

If doing so, it is also possible to easily decrease or increase the amount of light emitted from the solid-state light source for every projector unit or for every electro-optical modulating device.

(21) In the multi-projection display according to the exemplary aspect of the invention (20), the electro-optical modulating device may be a liquid crystal device which writes one unit screen information twice or more, and the solid-state light source control unit may have a function of allowing the solid-state light source to emit during one frame outside at least the first writing period of the liquid crystal device.

In the multi-projection display using the liquid crystal device as the electro-optical modulating device, since the liquid crystal device is a hold type display device, unlike a case of a CRT of an impulse type display device, there is a problem in that a smooth moving picture display is not obtained due to a so-called tailing phenomenon (As regards the tailing phenomenon, see "Image Quality of Moving Picture Display in a Hold Type Display" IEICE Technical Report, EID99-10, pages 55 to 60 (1999-06)).

According to the multi-projection display of exemplary aspect of the invention (21), by performing writing twice or more to one unit screen information, it is possible to make a flicker inconspicuous. Further, a liquid crystal device of a so-called n-time speed driving (Here, n is a natural number of 2 or more) is used and the solid-state light source is allowed to emit outside at least the first writing period of the liquid crystal device. Thus, it becomes possible to project intermittently the projection images onto the screen. For this reason, it is possible to alleviate the tailing phenomenon which is a defect of the hold type display, and further it is possible to perform moving picture display smoothly with favorable quality.

Further, according to the multi-projection display of exemplary aspect of the invention (21), the solid-state light source is allowed to emit during one frame outside the first writing period at which liquid crystal molecules do not yet sufficiently response. Thus, there is also an advantage in that it is possible to further improve contrast in the multi-projection display.

(22) In the multi-projection display according to the exemplary aspect of the invention (20), the electro-optical modulating device may be a liquid crystal device which writes an image sequentially for every screen region, and the solid-state light source control unit may have a function of allowing the solid-state light source to emit during one frame outside the image writing periods of the liquid crystal device.

For this reason, according to the multi-projection display of the exemplary aspect of the invention (22), during one frame or the like, a liquid crystal device which is capable of making a flicker inconspicuous by writing sequentially images for every screen region is used, and the solid-state light source is allowed to emit outside the image writing periods of the liquid crystal device. Thus, it becomes possible to project intermittently the projection images onto the screen. For this reason, it is possible to alleviate the tailing phenomenon which is a defect of the hold type display, and further it is possible to perform moving picture display smoothly with favorable quality.

Further, according to the multi-projection display of the exemplary aspect of the invention (22), the solid-state light source is allowed to emit outside the image writing periods. Thus, there is also an advantage in that it is possible to further enhance contrast in the multi-projection display.

BRIEF DESCRIPTION OF THE DRAWINGS

FIGS. 1A and 1B are schematics showing a construction of a multi-projection display according to a first exemplary embodiment;

FIGS. 12A to 12C are schematics illustrating advantages of the multi-projection display according to the first exemplary embodiment;

FIG. 13 is a schematic showing a construction of a multi-projection display according to a second exemplary embodiment;

FIGS. 16A and 16B are schematics illustrating advantages of the multi-projection display according to the third exemplary embodiment;

FIGS. 18A and 18B are schematics illustrating advantages of the multi-projection display according to the fourth exemplary embodiment;

FIG. 21 is a schematic illustrating advantages of the multi-projection display according to a sixth exemplary embodiment;

DETAILED DESCRIPTION OF EXEMPLARY EMBODIMENTS

First Exemplary Embodiment

Figure 2:
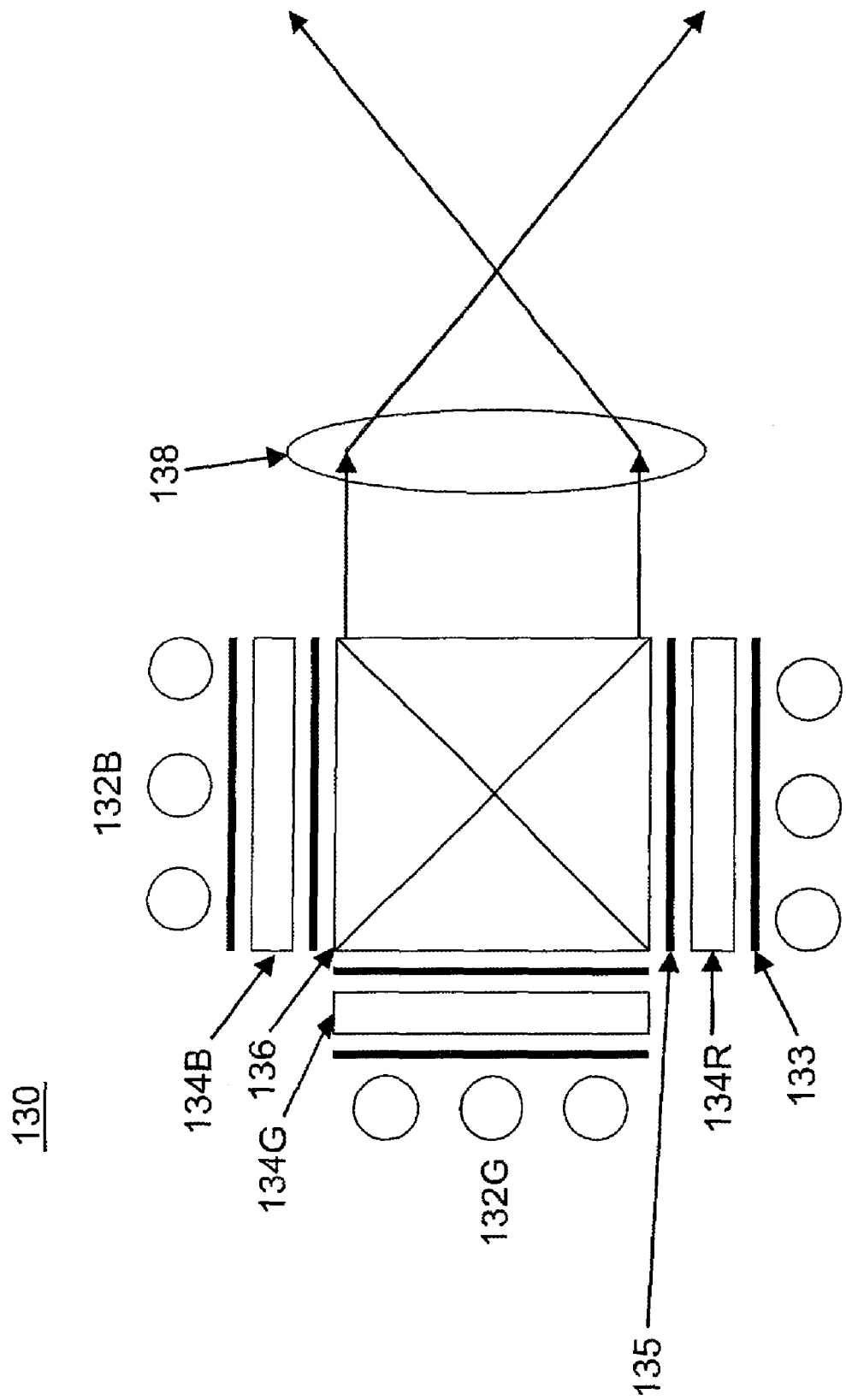
FIG. 2 is a schematic showing a construction of a projector unit in the multi-projection display according to the first exemplary embodiment.
Figure 3:
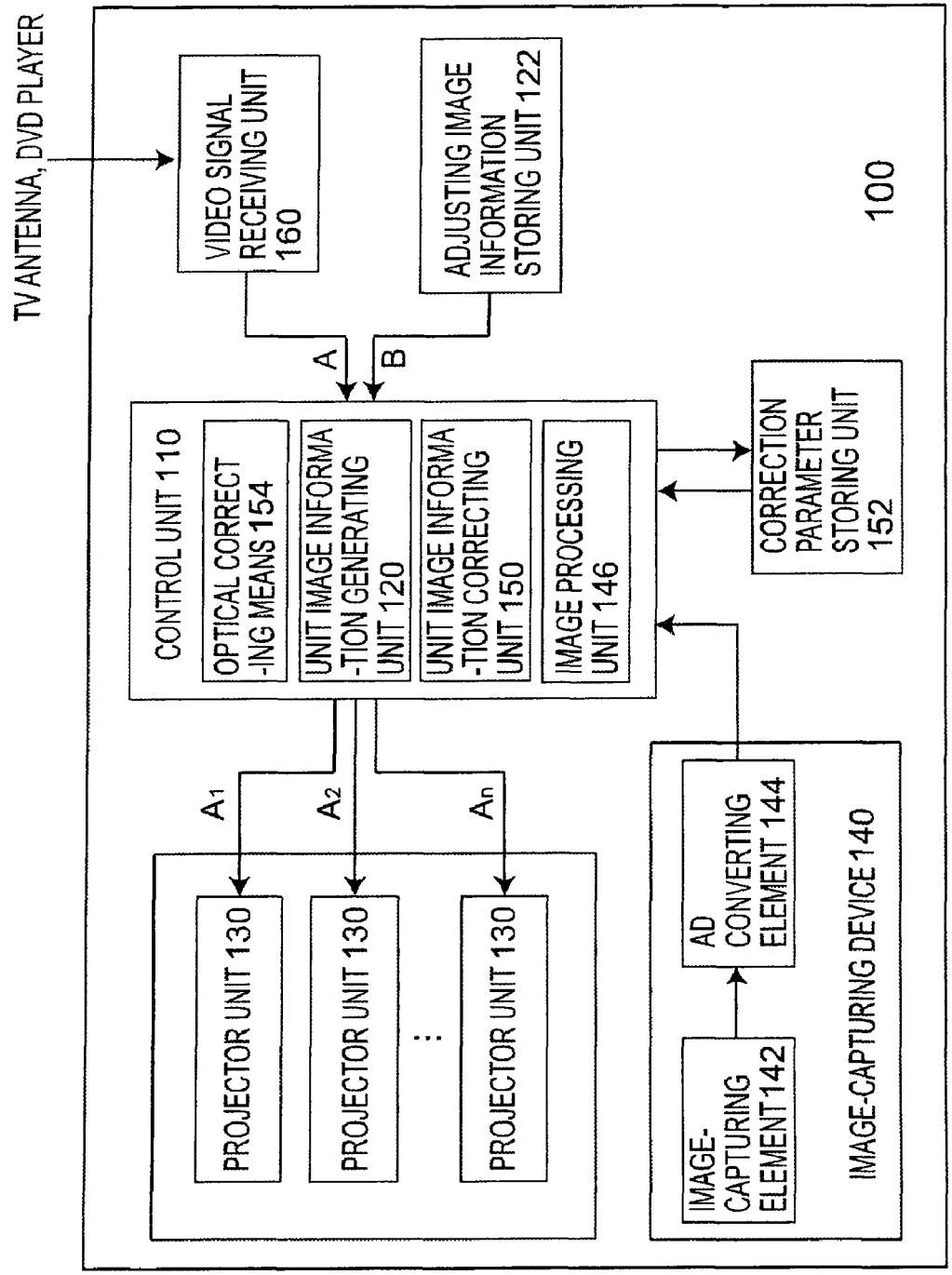
FIG. 3 is a schematic showing an outline of the multi-projection display according to the first exemplary embodiment.
Figure 4:
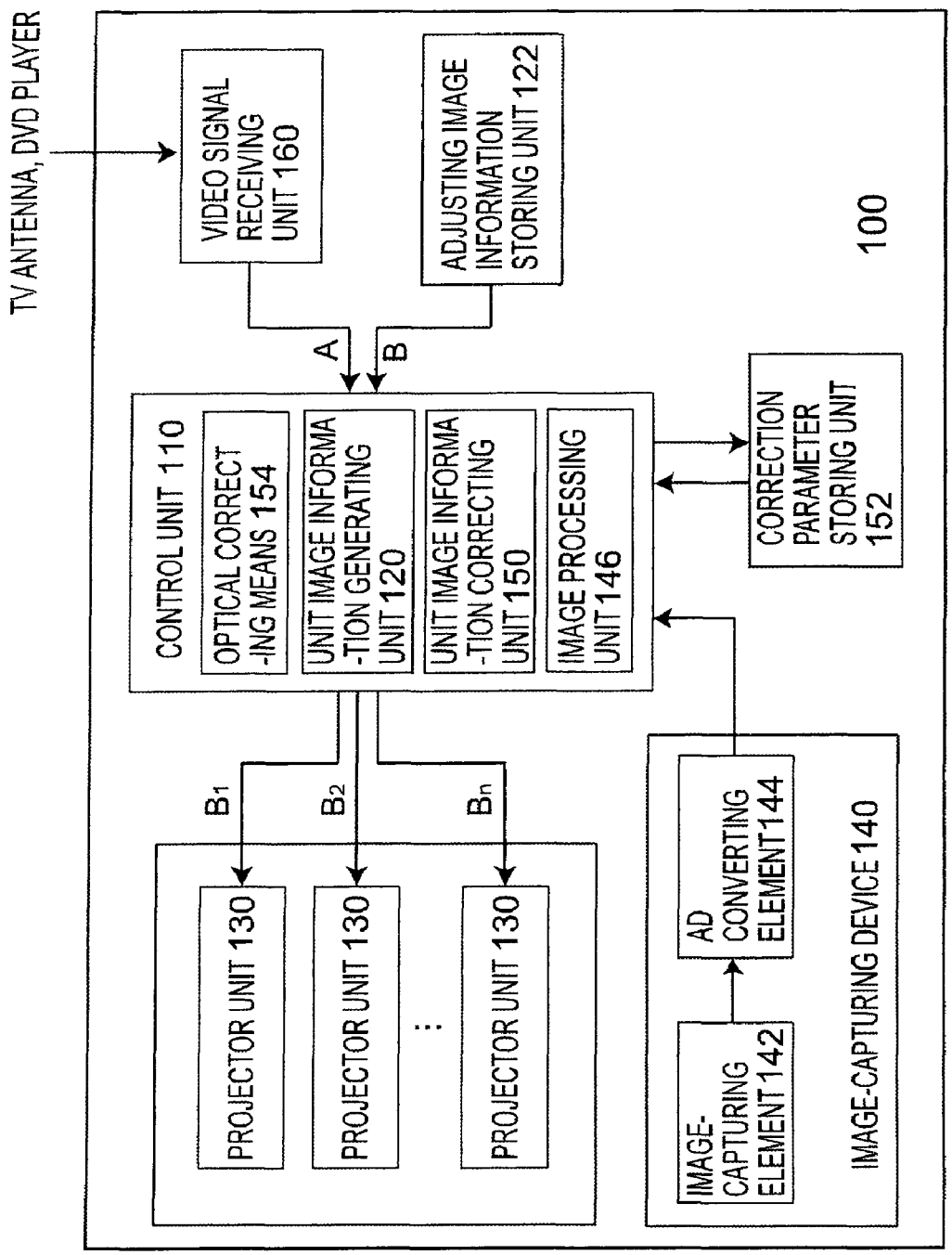
FIG. 4 is a schematic showing an outline of the multi-projection display according to the first exemplary embodiment.
Figure 5:
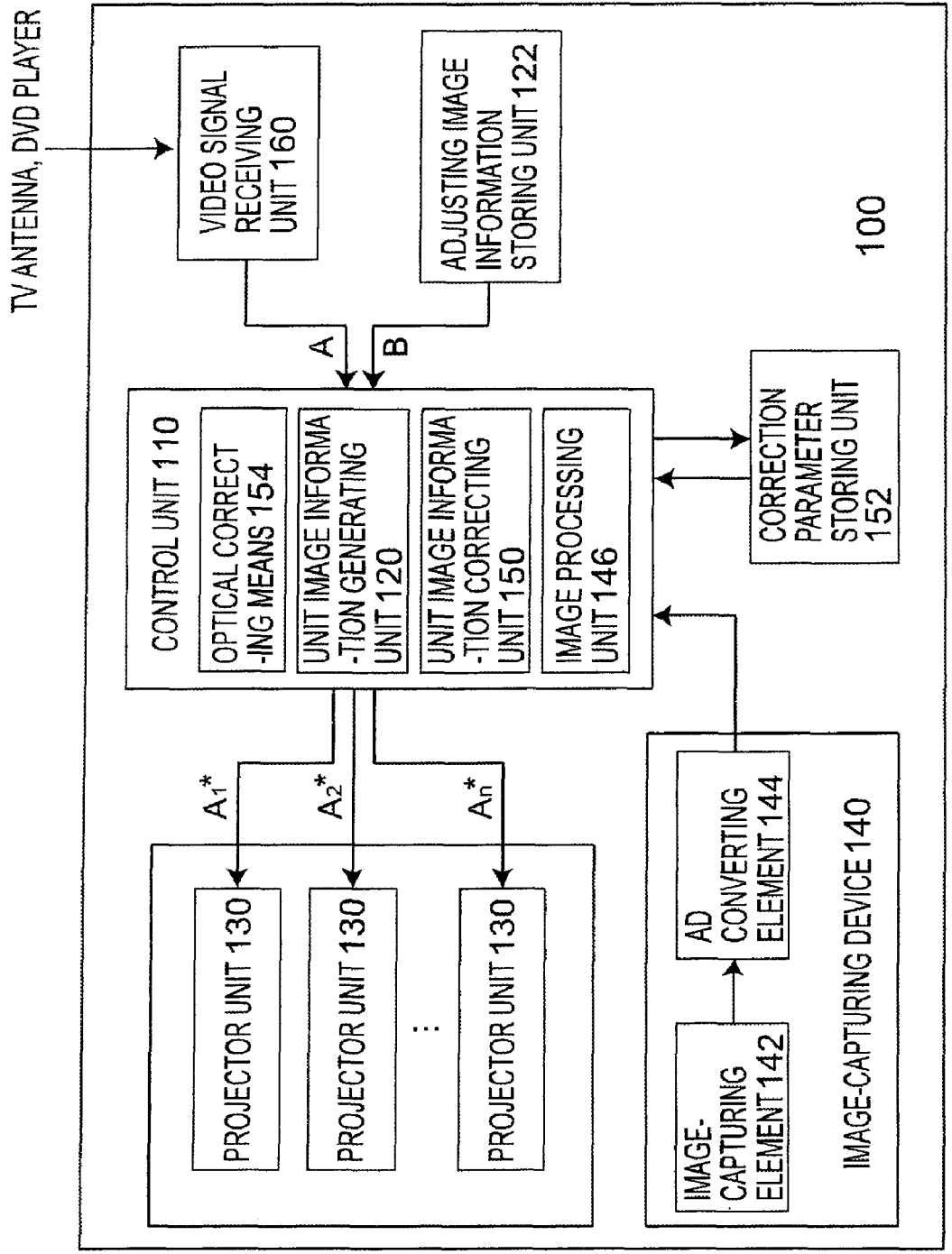
FIG. 5 is a schematic showing an outline of the multi-projection display according to the first exemplary embodiment.

FIGS. 1A and 1B are schematics showing a construction of a multi-projection display according to a first exemplary embodiment. FIG. 1A is a cross-sectional view as viewed from a side and FIG. 1B is a front view. FIG. 2 is a schematic showing a construction of a projector unit in the multi-projection display according to the first exemplary embodiment. FIGS. 3 to 5 are block schematics showing an outline of the multi-projection display according to the first exemplary embodiment.

A multi-projection display 100 according to the first exemplary embodiment is a rear surface projection type in which the projection images from four projector units 130 (In FIG. 1A, only two projector units are shown) arranged in a housing 102 are reflected by reflecting plates 104 to be projected onto a transmissive screen 108, as shown in FIG. 1B. As shown in FIG. 2, the respective projector units 130 include LED light sources 132R, 132G, and 132B as a solid-state light source, three liquid crystal devices 134R, 134G, and 134B as an electro-optical modulating device, a cross dichroic prism 136 and a projection lens 138. Illumination light components from the LED light sources 132R, 132G, and 132B are modulated by the liquid crystal devices 134R, 134G, and 134B based on unit image information $A_1$ to $A_n$ (See FIG. 3) or adjusting unit image information $B_1$ to $B_n$ (See FIG. 4) and are projected by the projection lens 138.

The multi-projection display 100 according to the first exemplary embodiment includes a control unit 110 having a unit image information generating unit 120, a unit image information correcting unit 150, an image processing unit 146 and an optical correcting device 154, four projector units 130, an image-capturing device 140, a video signal receiving unit 160, an adjusting image information storing unit 122 and a correction parameter storing unit 152, as shown in FIGS. 3 to 5.

The unit image information generating unit 120 has a function of generating a plurality of unit image information $A_1$ to $A_n$ based on original image information A (see FIG. 3) and a function of generating the adjusting unit image information $B_1$ to $B_n$ based on the adjusting image information B (See FIG. 4).

The image-capturing device 140 includes an image-capturing element 142 to capture a predetermined region of an adjusting image projected onto the transmissive screen 108 and an AD converting element 144 to convert an analog signal from the image-capturing element 142 into a digital signal.

The image processing unit 146 has a function of comparing a result obtained by performing an image processing on the result captured by the image-capturing device 140 with the adjusting image information B to output the comparison result to the unit image information correcting unit 150.

The unit image information correcting unit 150 has a function of correcting unit image information based on the capturing result by the image-capturing device 140 such that a boundary between unit images to be projected by adjacent projector units among the plurality of projector units 130 is not noticeable on the transmissive screen 108. Thus, corrected unit image information $A_{1*}$ to $A_{n*}$ are outputted to the respective projector units 130 (See FIG. 5).

The correction parameter storing unit 152 has a function storing correction parameters to be used when the unit image information correcting unit 150 corrects unit image information.

The adjusting image information storing unit 122 has a function of storing information regarding adjusting images which are objects to be captured by the image-capturing device 140.

According to the multi-projection display 100 of the first exemplary embodiment, since the LED light sources 132R, 132G, and 132B which can acquire a stable emitting state immediately after turning on, is used as a light source of the projector units 130, it is possible to drastically shorten the time required until the image-capturing device 140 captures the predetermined region of the adjusting image to be projected onto the transmissive screen 108 for every projector unit 130. As a result, it is possible to drastically shorten the adjustment operation time for matching the projection images from the respective projector units 130. Thus convenience is greatly enhanced.

Further, according to the multi-projection display 100 of the first exemplary embodiment, since the LED light sources 132R, 132G, and 132B can be freely set to a turned-on state or a turned-off state, a shutter used in Japanese Unexamined Patent Application Publication No. 2001-339672 is not needed. Since the LED light sources 132R, 132G, and 132B are in the stable emitting state immediately after being turned on, it is possible to begin capturing at once. Further, no time is required to operate the shutter. Thus it is also possible to further shorten the adjustment time.

Further, according to the multi-projection display 100 of the first exemplary embodiment, since the LED light sources 132R, 132G, and 132B are used as the solid-state light source, in addition to the stable emitting state, the multi-projection display has sufficient brightness and color-rendering property.

In the multi-projection display 100 according to the first exemplary embodiment, as described above, the unit image information correcting unit 150 corrects unit image information based on the result of capturing the adjusting unit images.

The unit image information correcting unit 150 may correct unit image information based on the result of capturing a general image. However, in the present exemplary embodiment, by correcting unit image information based on the result of capturing the adjusting unit images, it is possible to correct more accurately and rapidly.

As the adjusting unit image, various unit images suitable to correct the unit image information, such as a beta image of white or monochrome, a lattice shape of monochrome, may be used.

In this case, instead of previously storing the adjusting image information in the adjusting image information storing unit 122 and generating the adjusting unit images by the unit image information generating unit using the adjusting image information at the time of the adjustment operation, the adjusting unit image information may be previously stored and at the time of the adjustment operation, and the adjusting unit image information may be used as it is.

Further, when the adjustment operation is performed, the adjusting image information may be input (By a DVD or the like) and the unit image information generating unit may generate the adjusting unit image information using the adjusting image information. Further, when the adjustment operation is performed, the adjusting unit image information may be directly input.

In the multi-projection display 100 according to the first exemplary embodiment, the unit image information correcting unit 150 has a function of correcting the shapes, the positions and/or the inclinations of the unit images to be projected by the respective projector units 130. For this reason, the shapes, the positions and/or the inclinations between the projection images from the respective projector units 130 become proper. Thus it is possible to highly match the projection images from the respective projector units 130.

In the multi-projection display 100 according to the first exemplary embodiment, the unit image information correcting unit 150 has a function of correcting the brightness and/or colors of the unit images to be projected by the respective projector units 130. For this reason, the brightness and/or colors between the projection images from the respective projector units 130 become proper. Thus it is possible to highly match the projection images from the respective projector units 130.

FIGS. 6 to 12 are schematics showing advantages of the multi-projection display according to the first exemplary embodiment.

With reference to FIGS. 3 to 12, how the multi-projection display 100 according to the first exemplary embodiment may correct the shapes, the positions and/or the inclinations between the projection images from the respective projector units 130 will be described. Further, how the brightness and/or colors between the projection images from the respective projector units 130 may be corrected will be described.

Display State Before Correcting

A display state before correcting will be described.

Figure 6:
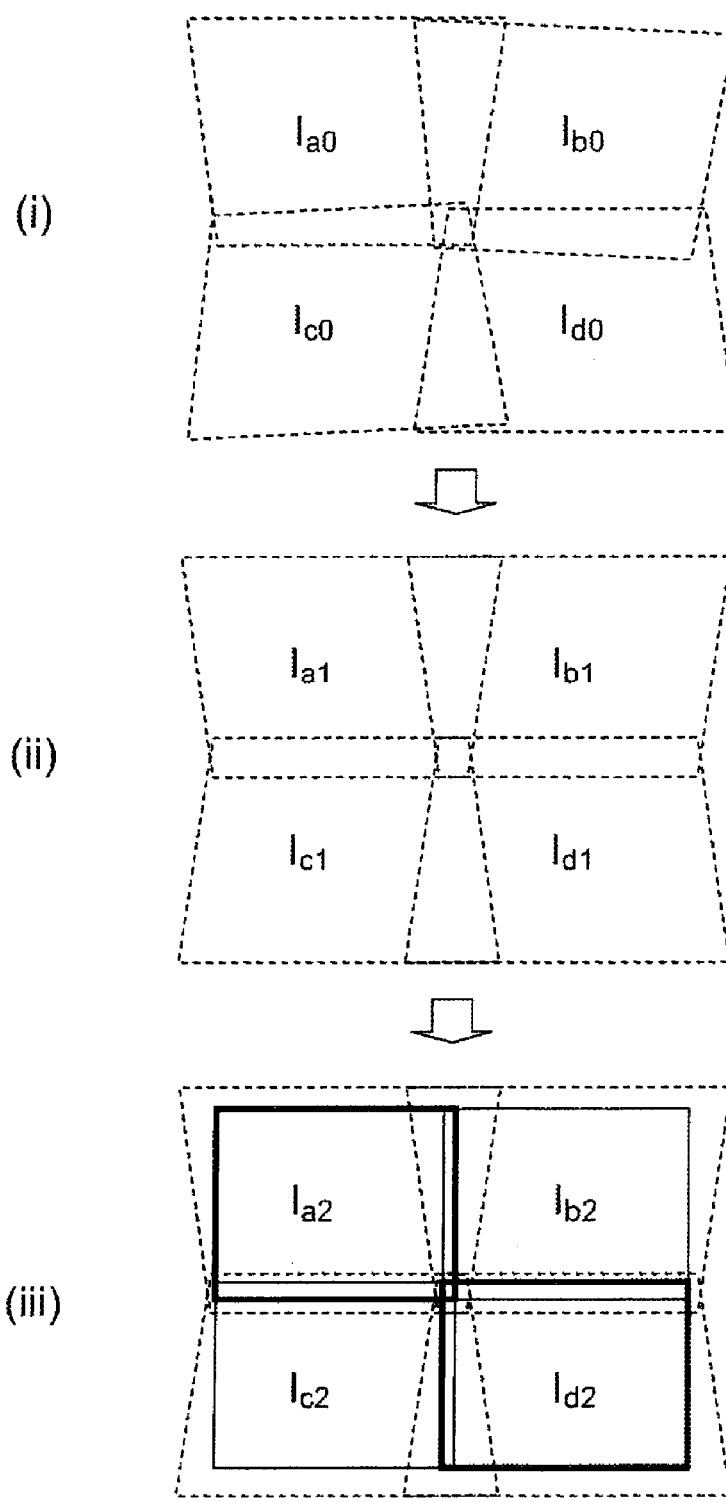
FIGS. 6(*i*)-6*iii* are schematics illustrating advantages of the multi-projection display according to the first exemplary embodiment.

Referring to FIG. 3, if original image information A is input from the video signal receiving unit 160 to the unit image information generating unit 120, the unit image information generating unit 120 generates unit image information $A_1$ to $A_n$ based on original image information A. The respective projector units 130 project the unit images corresponding to unit image information $A_1$ to $A_n$ onto the transmissive screen 108. Therefore, on the transmissive screen 108, the projection images according to the respective unit images from the respective projector units 130 are projected. In this situation, since the multi-projection display 100 is in a state before correcting, the distorted projection images ($I_{a0}$, $I_{b0}$, $I_{c0}$, $I_{d0}$) as shown in FIG. 6($i$) are projected.

First Adjustment Operation (An Adjustment Operation to the Shapes, the Positions and/or the Inclinations of the Unit Images by the Optical Correcting Unit 154)

The first adjustment operation will now be described.

Referring to FIG. 4, if adjusting image information B from the adjusting image information storing unit 122 is input to the unit image information generating unit 120, the unit image information generating unit 120 generates adjusting unit image information $B_1$ to $B_n$ based on adjusting image information B. The respective projector units 130 project the unit images corresponding to adjusting unit image information $B_1$ to $B_n$ onto the transmissive screen 108. In this situation, since the multi-projection display 100 is in a state before correcting, similar to the above description, since the multi-projection display 100 is in a state before correcting, the distorted projection images ($I_{a0}$, $I_{b0}$, $I_{c0}$, $I_{d0}$) as shown in FIG. 6($i$) are projected.

Next, with the image-capturing element 142 of the image-capturing device 140, predetermined regions of the respective projection images ($I_{a0}$, $I_{b0}$, $I_{c0}$, $I_{d0}$) relating to the adjusting images shown in FIG. 6($i$) are captured. And then, the optical correcting device 154 optically corrects the position and/or orientation of the housing of the respective projector units 130 based on the capturing result. Moreover, in exemplary aspects of the present invention, instead of the housing of the projector units 130, the position and/or orientation of the projection lens 138 of each of the projector units 130 or each of the reflecting plates 104 may be optically corrected.

If adjusting image information B from the adjusting image information storing unit 122 is inputted to the unit image information generating unit 120 again, the respective projector units 130 project the unit images corresponding to adjusting unit image information $B_1$ to $B_n$ onto the transmissive screen 108. In this situation, however, the position and/or orientation of the housing of the respective projector units 130 are being corrected based on the previous capturing result in the multi-projection display 100. Thus, on the transmissive screen 108, as shown in FIG. 6($ii$), the projection images ($I_{a1}$, $I_{b1}$, $I_{c1}$, $I_{d1}$) having reduced distortion are projected.

Second Adjustment Operation (An Adjustment Operation to the Shapes, the Positions and/or the Inclinations of the Unit Images by the Unit Image Information Correcting Unit 150)

The second adjustment operation will now be described.

Next, with the image-capturing element 142 of the image-capturing device 140, the respective projection images ($I_{a1}$, $I_{b1}$, $I_{c1}$, $I_{d1}$) according to the adjusting images shown in FIG. 6($ii$) are captured. Then, based on the capturing result, the unit image information correcting unit 150 determines the correction parameters to be used when unit image information is corrected. Subsequently, the determined correction parameters are stored in the correction parameter storing unit 152, and then, based on the correction parameters, a plurality of unit image information are generated from original image information.

Thus, if original image information A is input from the video signal receiving unit 160 to the unit image information generating unit 120, the unit image information generating unit 120 generates unit image information based on original image information A. In this situation, since unit image information is corrected by the correction parameters, unit image information $A_{1*}$ to $A_{n*}$ are generated. Therefore, the respective projector units 130 project the unit images corresponding to unit image information $A_{1*}$ to $A_{n*}$ onto the transmissive screen 108. In this situation, since the multi-projection display 100 is already adjusted, as shown in FIG. 6($iii$), the projection images ($I_{a2}$, $I_{b2}$, $I_{c2}$, $I_{d2}$) from the respective projector units 130 are aligned precisely.

Figure 7:
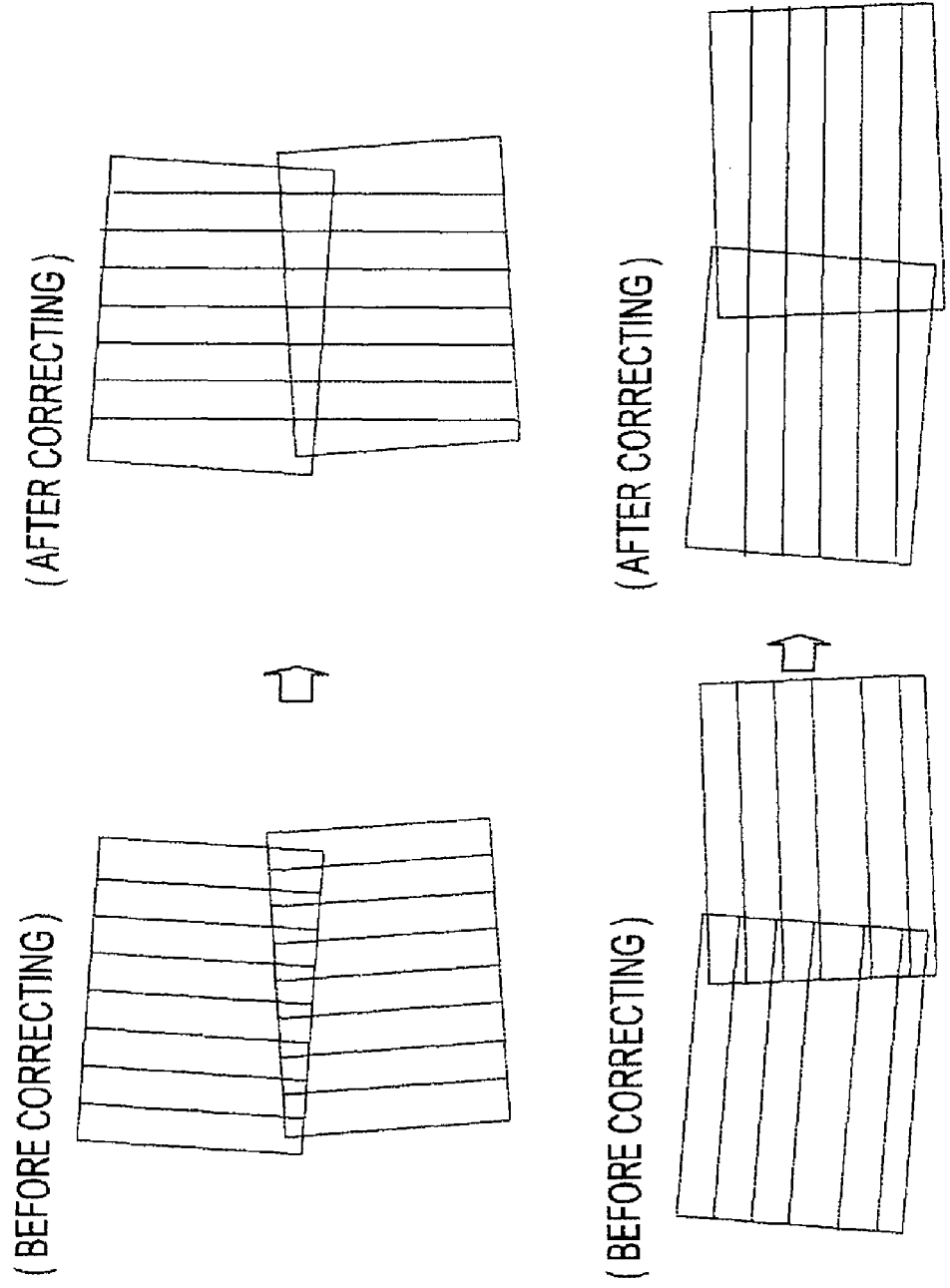
FIG. 7 is a schematic illustrating advantages of the multi-projection display according to the first exemplary embodiment.
Figure 8:
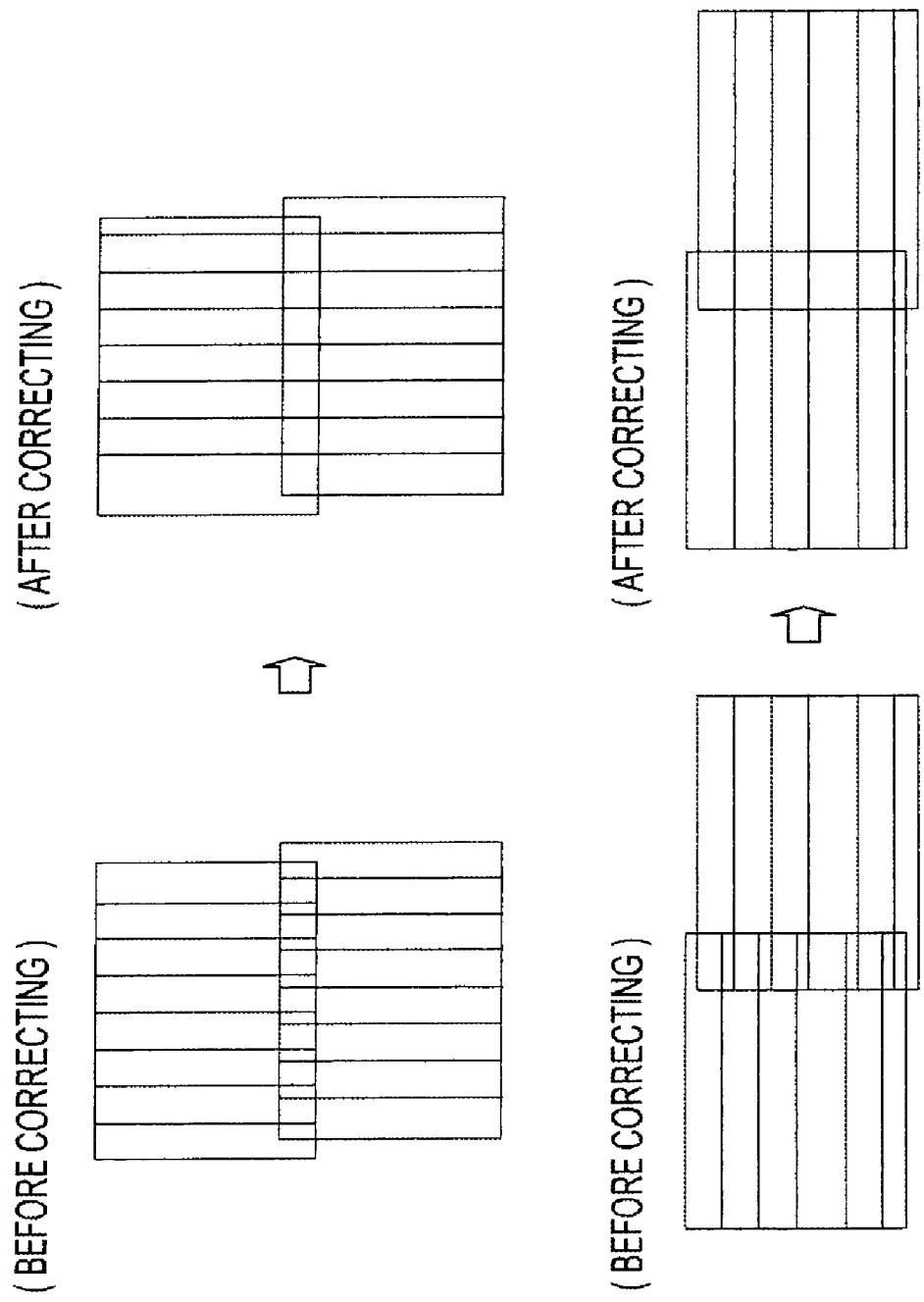
FIG. 8 is a schematic illustrating advantages of the multi-projection display according to the first exemplary embodiment.

Moreover, in the first adjustment operation and the second adjustment operation, for example, as shown in FIG. 7 (A case in which the inclinations between the respective unit images projected exist) or FIG. 8 (A case in which the inclinations between the respective unit images projected do not exist), the correction may be performed such that reference lines of the adjusting images in adjacent two projector units 130 comply with each other, or the operation may be executed such that the reference line of the adjusting image in one projector unit 130 is captured.

In both cases, it is needed to turn on only the light source in adjacent two projector units 130 or it is needed to turn on only the light source in one projector unit 130.

However, according to the multi-projection display 100 of the first exemplary embodiment, since the LED light sources 132R, 132G, and 132B which can acquire the stable emitting state immediately after turning on are used as the light source of the respective projector units 130, it is possible to drastically shorten the time required for the above-mentioned adjustment operation.

Third Adjustment Operation (An Adjustment Operation to Brightness and/or Colors of the Unit Images by the Unit Image Information Correcting Unit 150)

The third adjustment operation will now be described. For the purpose of simple description, an adjustment of an overlapped region in adjacent two projector units (Temporarily, referred to as $PJU_a$ and $PJU_b$) will be described.

Figure 9:
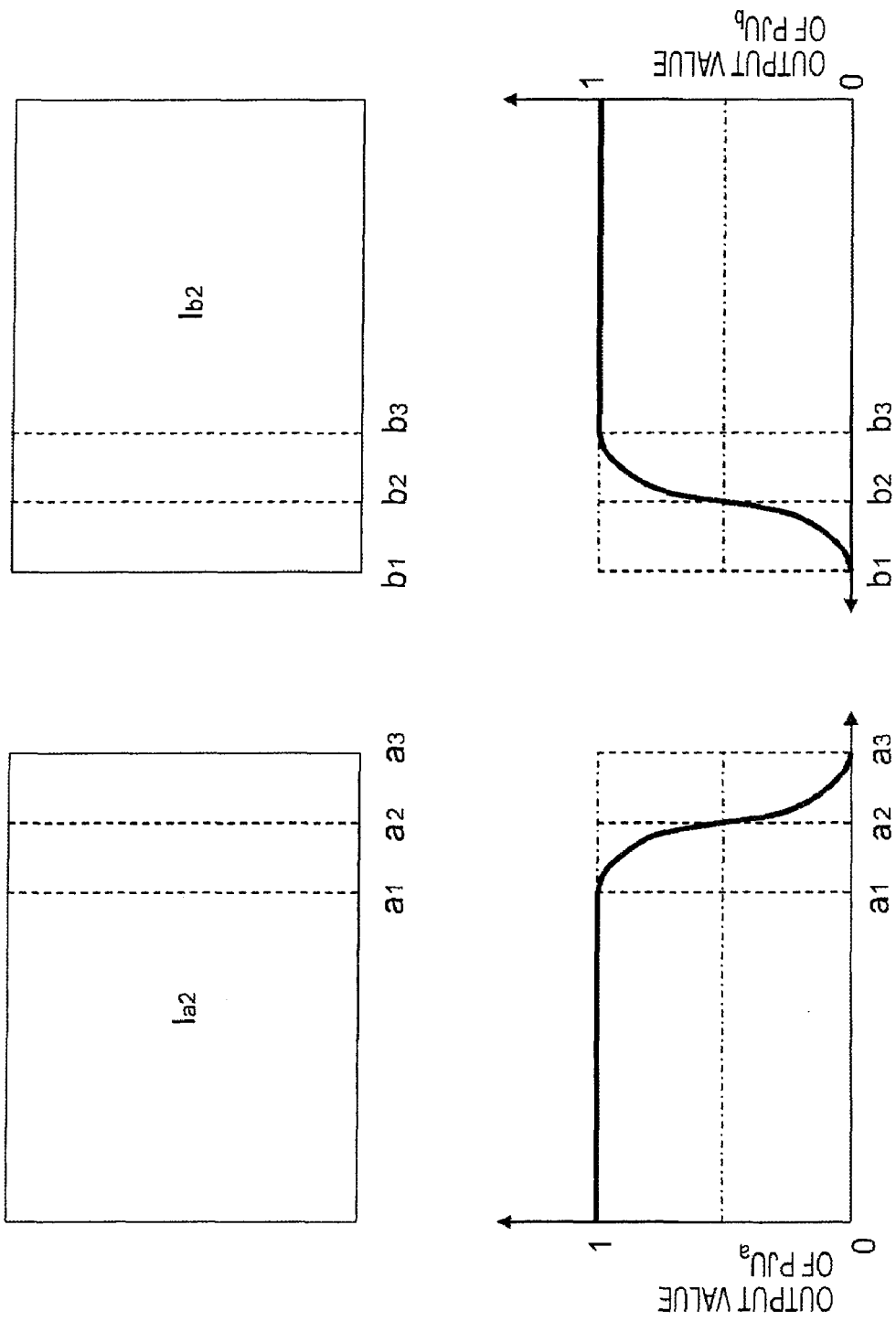
FIG. 9 is a schematic illustrating advantages of the multi-projection display according to the first exemplary embodiment.
Figure 10:
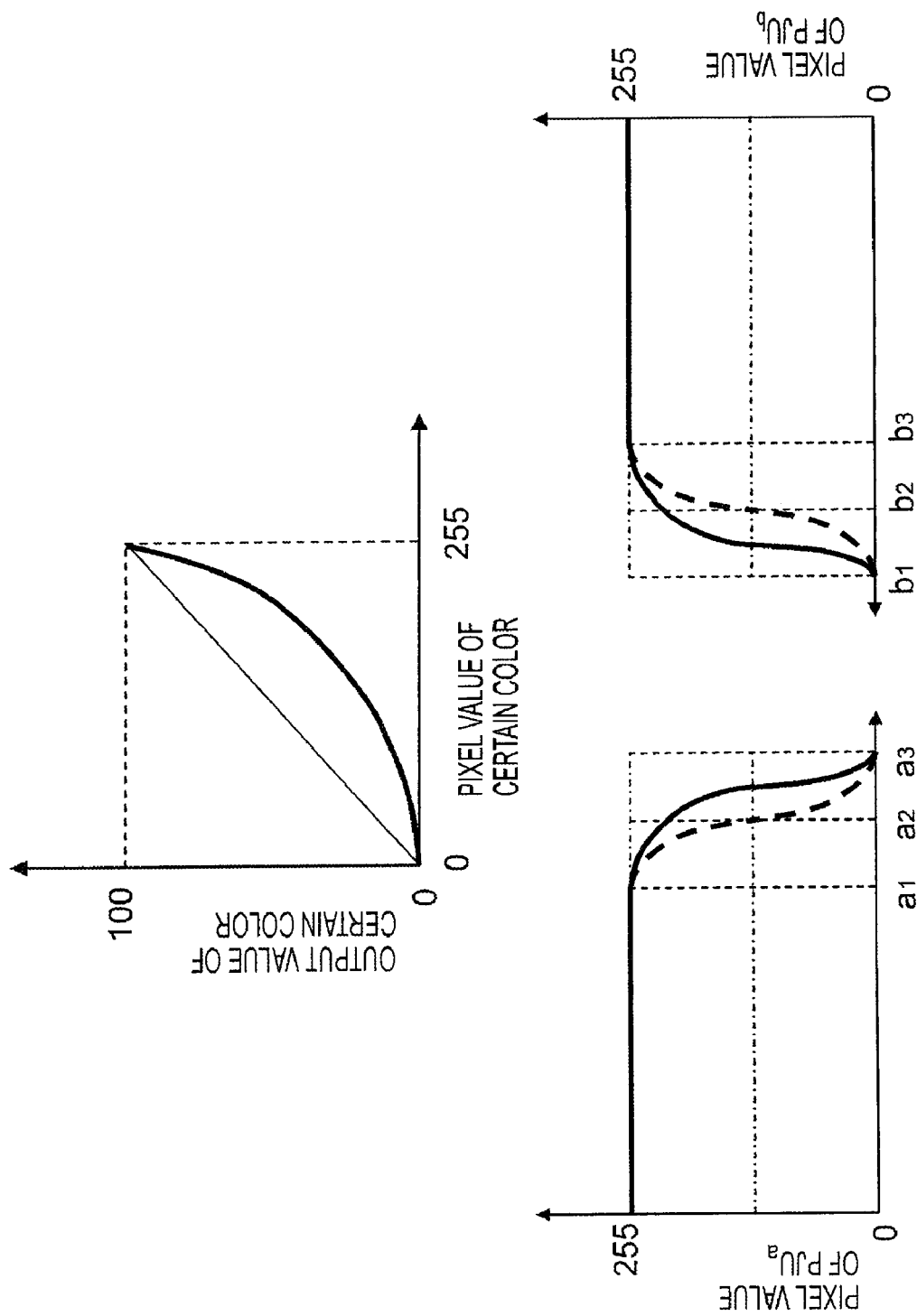
FIG. 10 is a schematic illustrating advantages of the multi-projection display according to the first exemplary embodiment.
Figure 11:
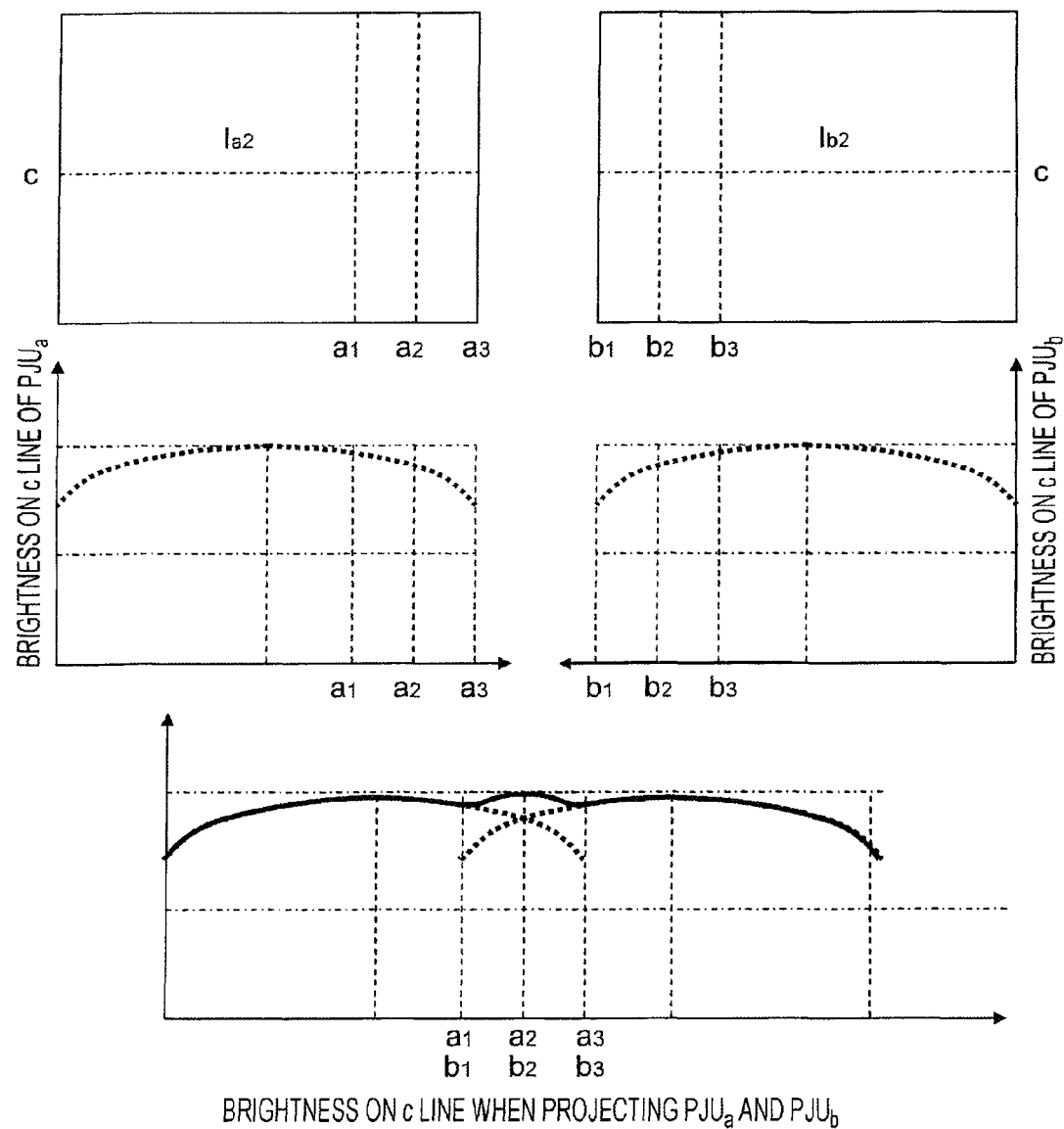
FIG. 11 is a schematic illustrating advantages of the multi-projection display according to the first exemplary embodiment.

First, as shown in FIG. 9, a weight function in the overlapped region is added to a pixel value of unit image information such that the projection images ($I_{a2}$, $I_{b2}$) from the adjacent projector units $PJU_a$ and $PJU_b$ are connected smoothly to each other. In this situation, as the weight function, as shown in FIG. 10, a weight function taking γ correction into consideration is used. By doing so, as shown in FIG. 11, the projection images from the adjacent projector units PJU$_a$ and PJU$_b$ are connected to each other. As a result, as shown in FIGS. 12A to 12C, the projection images from the adjacent two projector units are favorably synthesized and smoothly connected to each other.

In the multi-projection display 100 according to the first exemplary embodiment, when two unit image information are generated based on original image information relating to an original image (FIG. 12A), the unit images (FIG. 12B) are generated such that they are smoothly connected to each other on the transmissive screen 108 (FIG. 12C). Thus, the projection images from the adjacent two projector units PJU$_a$ and PJU$_b$ are favorably synthesized and smoothly connected to each other.

In the multi-projection display 100 according to the first exemplary embodiment, the unit image information correcting unit 150 has a function of correcting the brightness and/or color for every pixel in the plurality of projector units 130.

For this reason, it is possible to highly match the projection images from the respective projector units 130, and thus it is possible to project an image extremely true to original image information onto the screen.

In this case, the unit image information correcting unit 150 may have a function of correcting the unit image to the brightness and/or color for every pixel in the respective projector units 130 by comparing all of the adjusting image, which are formed by a plurality of adjusting unit images to be projected by the plurality of projector units 130 with an original adjusting image.

The multi-projection display 100 according to the first exemplary embodiment may include a correction parameter automatic acquiring device to capture the adjusting image in certain circumstances to automatically acquire the correction parameters.

For this reason, for example, when the correction parameters need to be determined again (Acquired again. For example, three months lapse after acquiring again), the correction parameter automatic acquiring device may operate automatically to acquire the correction parameters again. Further, when the regular time comes every day (For example, at 4 a.m.), the correction parameter automatic acquiring device may operate automatically to acquire the correction parameters again. Thus, without troubling the user, it is possible to maintain smooth image quality, and further convenience is enhanced.

Further, even though the characteristics of the LED light sources 132R, 132G, and 132B or the liquid crystal devices 134R, 134G, and 134B are changed by variation per hour, the correction parameters corresponding to the change in characteristic can be automatically acquired. Thus, it is possible to constantly suppress deterioration of image quality due to the variation per hour.

Second Exemplary Embodiment

Figure 14:
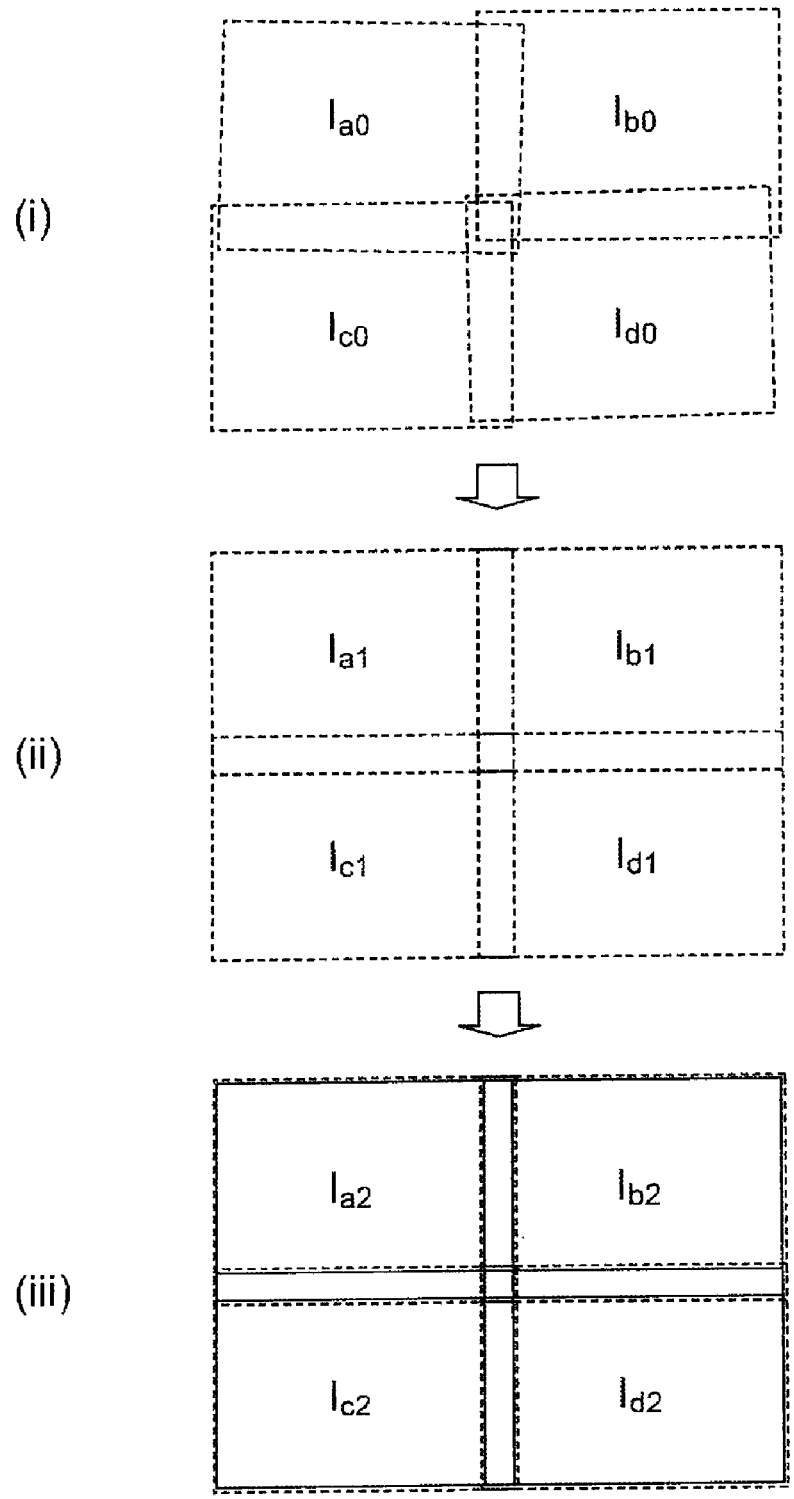
FIGS. 14(*i*)-14(*iii*) are schematics illustrating advantages of the multi-projection display according to the second exemplary embodiment.

FIG. 13 is a schematic showing a construction of a multi-projection display according to a second exemplary embodiment. FIG. 14 is a schematic illustrating advantages of the multi-projection display according to the second exemplary embodiment.

The multi-projection display 200 according to the second exemplary embodiment is constructed such that an optical axis of a projection light flux from each of the projector units 230 is orthogonal to the screen surface of the transmissive screen 208, as shown in FIG. 13.

For this reason, the unit images from the respective projector units 230 do not have trapezoidal distortion. As a result, advantages in the multi-projection display 200 according to the second exemplary embodiment are as shown in FIG. 14, unlike FIG. 6 showing advantages in the multi-projection display 100 according to the first exemplary embodiment.

However, in the multi-projection display 200 according to the second exemplary embodiment, since the LED light sources (not shown) which can acquire the stable emitting state immediately after turning on (instantly turned on) are used as the light source of the respective projector units 230. Thus, it is possible to obtain the same advantages as those of the multi-projection display 100 according to the first exemplary embodiment.

Third Exemplary Embodiment

Figure 15:
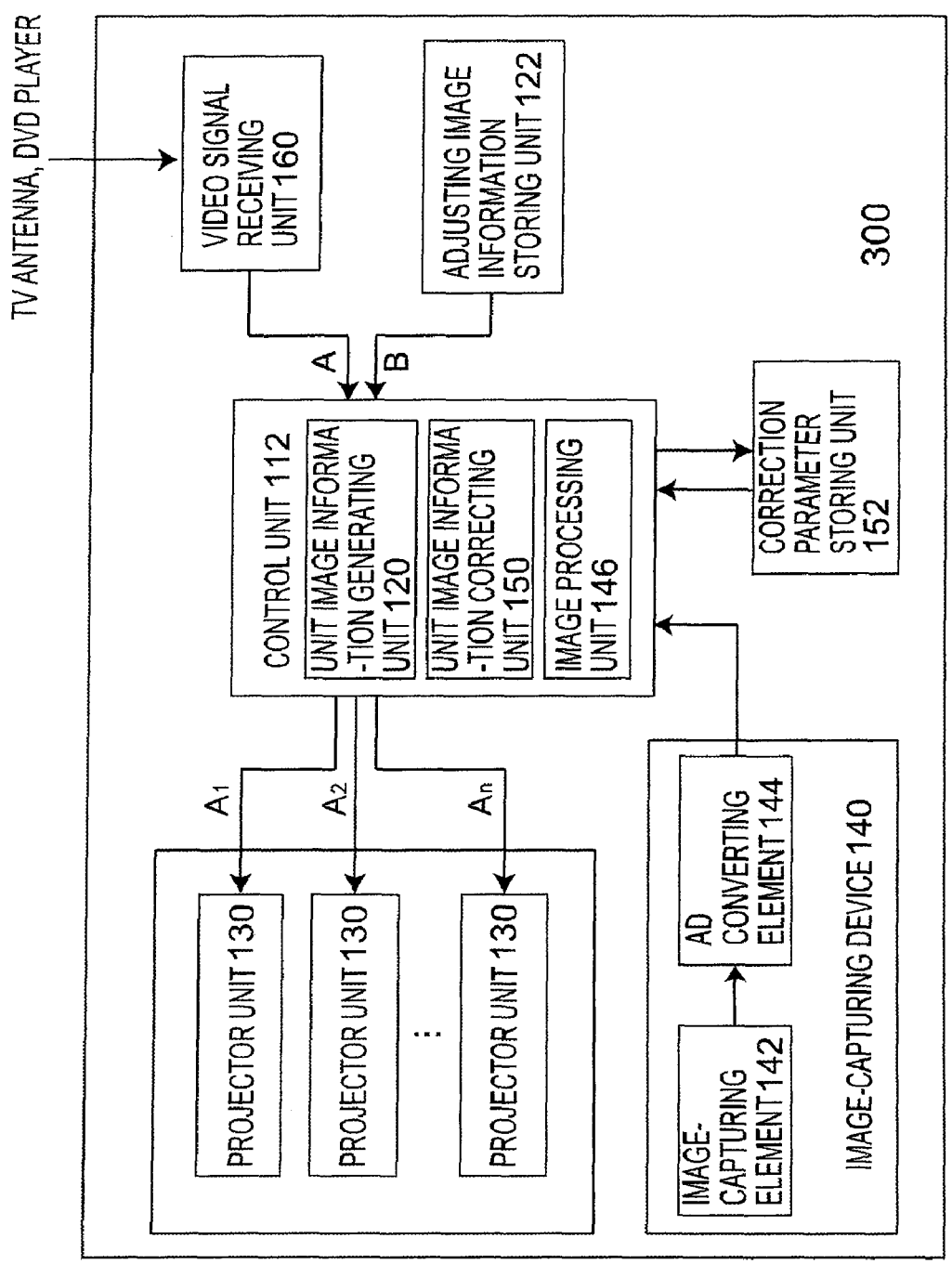
FIG. 15 is a schematic showing an outline of the multi-projection display according to a third exemplary embodiment.

FIG. 15 is a block schematic showing an outline of a multi-projection display according to the third exemplary embodiment. FIGS. 16A and 16B are schematics illustrating advantages of the multi-projection display according to the third exemplary embodiment. FIG. 16A is a schematic showing advantages in the case in which the unit image has trapezoidal distortion, and FIG. 16B is a schematic showing advantages in the case in which the unit image does not have trapezoidal distortion.

As shown in FIG. 15, the multi-projection display 300 according to the third exemplary embodiment has a construction of a control unit different from the multi-projection displays 100 and 200 according to the first exemplary embodiment and the second exemplary embodiment. That is, in the multi-projection display 300 according to the third exemplary embodiment, the control unit 112 has a construction excluding the optical correcting device 154 from the construction of the control unit 110 in the multi-projection display 100 and 200 according to the first exemplary embodiment and the second exemplary embodiment.

However, in the multi-projection display 300 according to the third exemplary embodiment, the LED light sources (not shown) which can acquire the stable emitting state immediately after turning on (instantly turned on) are used as the light source of the respective projector units 130. Thus, it is possible to obtain the same advantages as those of the multi-projection display 100 and 200 according to the first exemplary embodiment and the second exemplary embodiment.

Further, the multi-projection display 300 according to the third exemplary embodiment can correct the unit images without using the optical correcting device. Thus, it is possible to simplify the structure. Further, it has an advantage in that it is possible to reduce design costs and enhance reliability. In particular, the multi-projection display 300 can be suitably used as a rear surface projection type multi-projection display in which the projector units are fixedly arranged in the housing.

Moreover, in the multi-projection display 300 according to the third exemplary embodiment, the unit image information is corrected only by the working of the unit image information correcting unit 150, without using the optical correcting device. Thus, hereinafter, the adjustment method will be described.

Display State Before Correcting

Referring to FIG. 15, if original image information A is inputted from the video signal receiving unit 160 to the unit image information generating unit 120, the unit image information generating unit 120 generates unit image information A$_1$ to A$_n$ based on original image information. The respective projector units 130 project the unit images corresponding to unit image information A$_1$ to A$_n$ onto the screen. Therefore, on the screen, the projection images relating to the respective unit images from the respective projector units 130 are projected. In this situation, since the multi-projection display 100 is in a state before correcting, the distorted projection images ($I_{a0}$, $I_{b0}$, $I_{c0}$, $I_{d0}$) as shown in FIG. 16A are projected.

First Adjustment Operation (An Adjustment Operation to the Shapes, the Positions and/or the Inclinations of the Unit Images by the Unit Image Information Correcting Unit 150)

The first adjustment operation will be described.

Next, if adjusting image information B is input from the adjusting image information storing unit 122 to the unit image information generating unit 120, the unit image information generating unit 120 generates adjusting unit image information $B_1$ to $B_n$ (not shown) based on adjusting image information B. The respective projector units 130 project the unit images corresponding to adjusting unit image information $B_1$ to $B_n$ onto the screen. In this situation, since the multi-projection display 300 is in a state before correcting, similar to the above description, the distorted projection images ($I_{a0}$, $I_{b0}$, $I_{c0}$, $I_{d0}$), as shown in FIG. 16A, are projected.

Next, with the image-capturing element 142 of the image-capturing device 140, the respective projection images ($I_{a0}$, $I_{b0}$, $I_{c0}$, $I_{d0}$) relating to the adjusting images shown in FIG. 16A are captured. Then, based on the capturing result, the unit image information correcting unit 150 determines the correction parameters to be used when unit image information is corrected. Subsequently, the determined correction parameters are stored in the correction parameter storing unit 152. Then, based on the correction parameters, a plurality of unit image information are generated from original image information.

Thus, if original image information A is input from the video signal receiving unit 160 to the unit image information generating unit 120, the unit image information generating unit 120 generates unit image information based on original image information A. But in this situation, since unit image information is corrected by the correction parameters, unit image information $A_{1*}$ to $A_{n*}$ (not shown) are generated. Therefore, the respective projector units 130 project the unit images corresponding to unit image information $A_{1*}$ to $A_{n*}$ onto the screen. In this situation, since the multi-projection display 300 is already adjusted, as shown in FIG. 16B, the projection images ($I_{a2}$, $I_{b2}$, $I_{c2}$, $I_{d2}$) from the respective projector units 130 are located precisely.

Second Adjustment Operation (An Adjustment Operation to Brightness and/or Colors of the Unit Images by the Unit Image Information Correcting Unit 150)

The second adjustment operation will be described. For the purpose of simple description, an adjustment of an overlapped region in adjacent two projector units (Temporarily, referred to as $PJU_a$ and $PJU_b$) will be described.

First, as shown in FIG. 9, a weight function in the overlapped region is added to a pixel value of unit image information such that the projection images ($I_{a2}$, $I_{b2}$) from the adjacent projector units $PJU_a$ and $PJU_b$ are smoothly connected to each other. In this situation, as the weight function, as shown in FIG. 10, a weight function taking γ correction into consideration is used. By doing so, as shown in FIG. 11, the projection images from the adjacent projector units $PJU_a$ and $PJU_b$ are connected to each other. As a result, as shown in FIGS. 12A to 12C, the projection images from the adjacent two projector units are favorably synthesized and smoothly connected to each other.

In the multi-projection display 300 according to the third exemplary embodiment, when two unit image information is generated based on original image information relating to an original image (FIG. 12A), the unit images (FIG. 12B) are generated such that they are smoothly connected to each other on the transmissive screen (FIG. 12C). Thus, the projection images from the adjacent two projector units $PJU_a$ and $PJU_b$ are favorably synthesized and smoothly connected to each other.

Fourth Exemplary Embodiment

Figure 17:
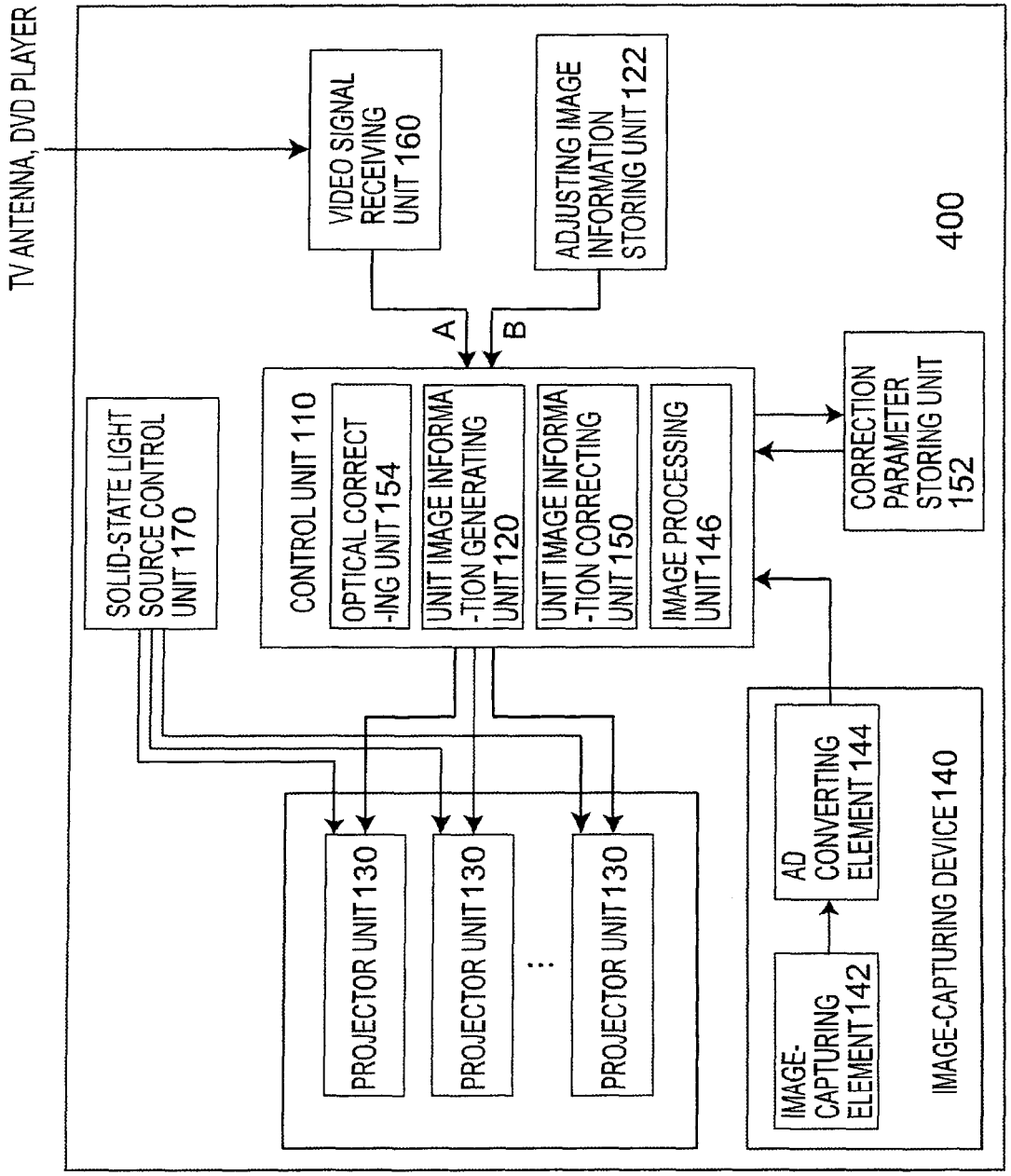
FIG. 17 is a schematic illustrating an outline of the multi-projection display according to a fourth exemplary embodiment.

FIG. 17 is a schematic showing an outline of a multi-projection display according to a fourth exemplary embodiment. FIGS. 18 and 19 are schematics illustrating advantages of the multi-projection display according to the fourth exemplary embodiment. FIG. 18A shows a case in which the highest brightness level white display is made in an entire screen of the multi-projection display according to the first exemplary embodiment. FIG. 18B shows a case in which the highest brightness level white display is made in an entire screen of the multi-projection display according to the fourth exemplary embodiment.

As shown in FIG. 17, the multi-projection display 400 according to the fourth exemplary embodiment may include a solid-state light source control unit 170 to control the amount of emitted light of the LED light sources 132R, 132G, and 132B for every projector unit 130, in addition to the construction of the multi-projection display 100 according to the first exemplary embodiment. The solid-state light source control unit 170 has a function of controlling the amount of emitted light of the LED light sources 132R, 132G, and 132B for every liquid crystal device 134R, 134G or 134B.

For this reason, the multi-projection display 400 according to the fourth exemplary embodiment has the following advantages, in addition to the advantages in the multi-projection display 100 according to the first exemplary embodiment.

Figure 19A:
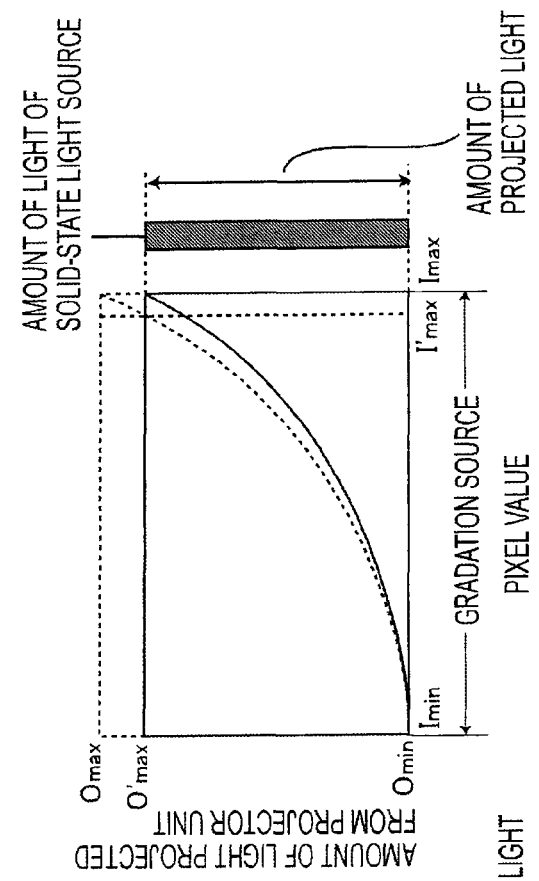
FIGS. 19A and 19B are schematics illustrating advantages of the multi-projection display according to a fifth exemplary embodiment.
Figure 19B:
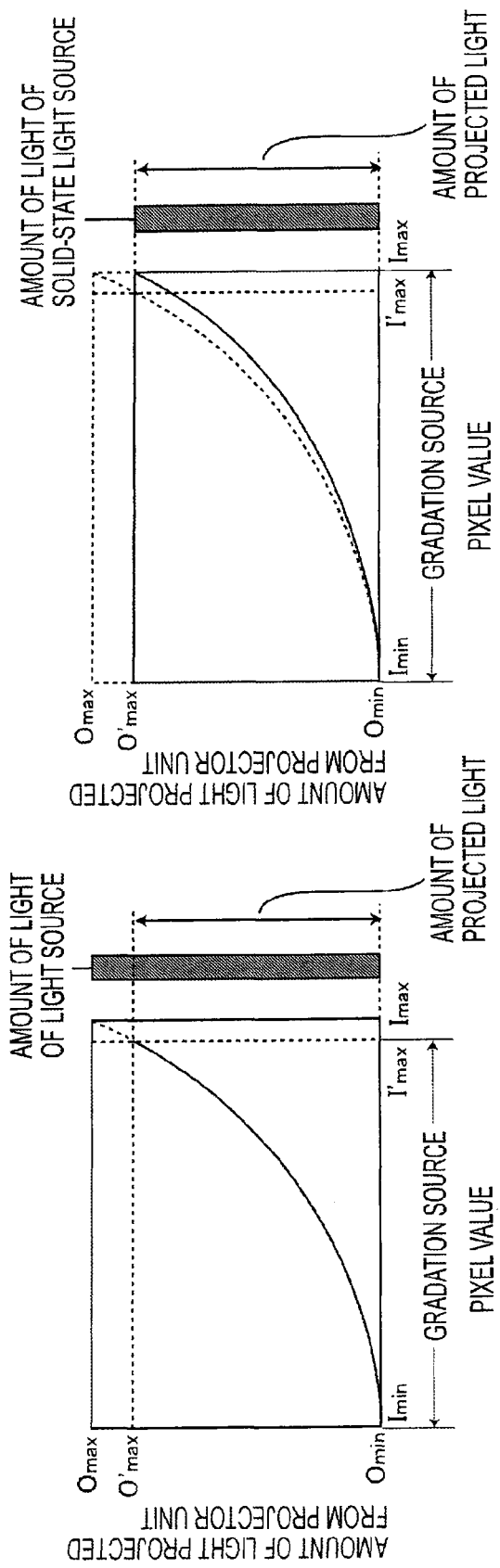

According to the multi-projection display 400 of the fourth exemplary embodiment, as shown in FIG. 18B, it is possible to control separately the amount of emitted light of the LED light sources 132R, 132G, and 132B for every projector unit 130. Thus, it is possible to absorb the difference of the brightness characteristics or the color characteristics for every projector unit 130 by controlling the amount of emitted light of the LED light sources 132R, 132G, and 132B. For this reason, as shown in FIGS. 19A and 19B, there is no need to use the gradation source in the electro-optical modulating device 134R, 134G, and 134B. Thus, there is no case in which the number of effective gradations inherent in the multi-projection display is lowered or the dynamic range becomes narrow.

Further, according to the multi-projection display 400 of the fourth exemplary embodiment, it is possible to control separately the amount of emitted light of the LED light sources 132R, 132G, and 132B for every liquid crystal device 134R, 134G or 134B. Thus, it is also possible to absorb the difference of the brightness characteristics or the color characteristics by controlling the amount of emitted light of the LED light sources 132R, 132G, and 132B.

In the multi-projection display 400 according to the fourth exemplary embodiment, as shown in FIG. 18B, in order to absorb the difference of the brightness characteristic for every projector unit 130, in the projector units (projector units projecting the unit images Ia, Ib and Id) other than the projector unit having the lowest brightness level (projector unit projecting the unit image Ic), the amount of emitted light of the LED light sources is lowered such that the brightness level in the projector units complies with the brightness level in the projector unit having the lowest brightness level.

In the multi-projection display 400 according to the fourth exemplary embodiment, the amount of emitted light of the LED light sources is controlled for every color light component.

In the multi-projection display 400 according to the fourth exemplary embodiment, the solid-state light source control unit 170 may separately supply control voltages to be supplied to the LED light sources 132R, 132G, and 132B or may separately control the emitting periods of the LED light sources 132R, 132G, and 132B, for every projector unit 130 and/or for every liquid crystal device 134R, 134G or 134B. In any cases, it is possible to easily decrease or increase brightness of the LED light sources 132R, 132G, and 132B.

Fifth Exemplary Embodiment

Figure 20B:
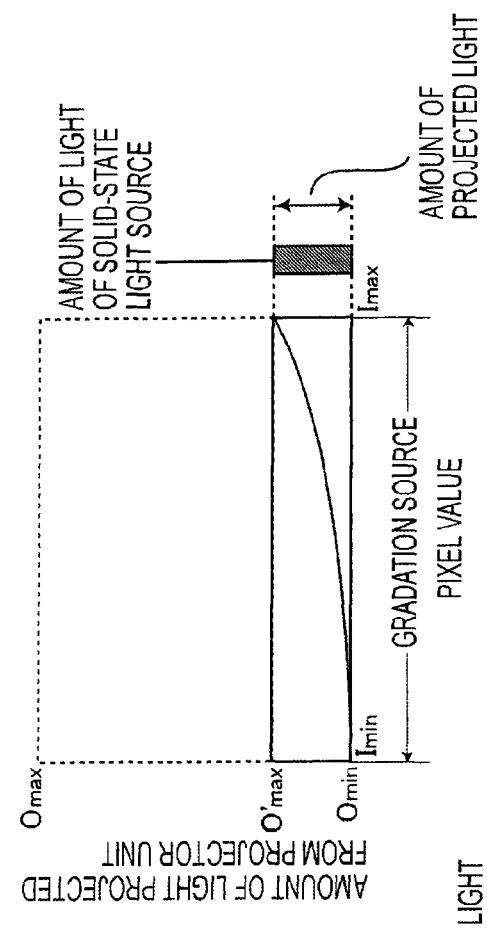
FIGS. 20A and 20B are schematics illustrating advantages of the multi-projection display according to the fifth exemplary embodiment.
Figure 20A:
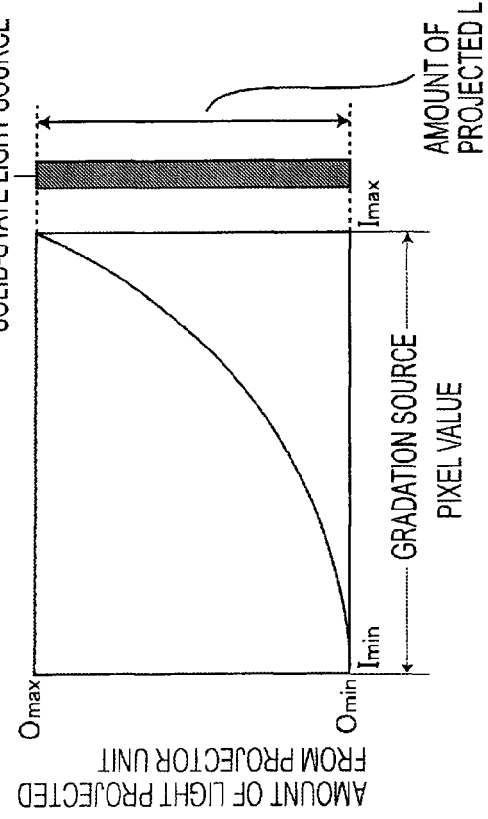

FIGS. 20A and 20B are schematics illustrating advantages of a multi-projection display according to a fifth exemplary embodiment.

The multi-projection display 500 (not shown) according to the fifth exemplary embodiment includes the solid-state light source control unit 172 (not shown) to control the amount of emitted light of the LED light sources 132R, 132G, and 132B for every projector unit 130, similar to the multi-projection display 400 according to the fourth exemplary embodiment. Further, the solid-state light source control unit 172 has a function of controlling the amount of emitted light of the LED light sources 132R, 132G, and 132B for every liquid crystal device 134R, 134G or 134B, similar to the multi-projection display 400 according to the fourth exemplary embodiment.

In the multi-projection display 500 according to the fifth exemplary embodiment, the solid-state light source control unit 172 also has a function of dynamically controlling the amount of emitted light of the LED light sources 132R, 132G, and 132B, in addition to the above-mentioned function.

For this reason, the multi-projection display 500 according to the fifth exemplary embodiment has the following advantages, in addition to the advantages in the multi-projection display 400 according to the fourth exemplary embodiment.

As shown in FIG. 20B, in the case in which a totally dark screen is displayed (for example, a case in which a night scene in a movie is displayed), instead of or in addition to lowering the transmittance of the liquid crystal devices 134R, 134G, and 134B, by decreasing the amount of emitted light of the LED light sources 132R, 132G, and 132B, it is possible to make an entire screen dark. Further, as shown in FIG. 20A, in the case in which a totally bright screen is displayed (for example, a case in which an outdoor scene in the daytime in a movie is displayed), instead of or in addition to increasing the transmittance of the liquid crystal devices 134R, 134G, and 134B, by increasing the amount of emitted light of the LED light sources 132R, 132G, and 132B, it is possible to make the entire screen bright.

For this reason, it is possible to increase the number of effective gradations or the dynamic range, which results in a high image quality multi-projection display having an excellent black level.

Sixth Exemplary Embodiment

FIG. 21 is a schematic illustrating advantages of a multi-projection display according to a sixth exemplary embodiment.

The multi-projection display 600 (not shown) according to the sixth exemplary embodiment includes the solid-state light source control unit 174 (not shown) to control the amount of emitted light of the LED light sources 132R, 132G, and 132B for every projector unit 130 and for every liquid crystal device 134R, 134G or 134B, similar to the multi-projection display 500 according to the fifth exemplary embodiment. Further, the solid-state light source control unit 174 also has a function of dynamically controlling the amount of emitted light of the LED light sources 132R, 132G, and 132B, similarly to the multi-projection display 500 according to the fifth exemplary embodiment.

In the multi-projection display 600 according to the sixth exemplary embodiment, the solid-state light source control unit 174 also has a function of dynamically controlling the amount of emitted light of the LED light sources 132R, 132G, and 132B for every projector unit 130, in addition to the above-mentioned function.

For this reason, the multi-projection display 600 according to the sixth exemplary embodiment has the following advantages, in addition to the advantages in the multi-projection display 500 according to the fifth exemplary embodiment.

That is, as shown in FIG. 21, in the case in which an image in which a bright screen and a dark screen exist in one screen is displayed, it is possible for the multi-projection display to exhibit the expression ability exceeding the number of effective gradation or the dynamic range inherent in the multi-projection display. In addition, it is possible to perform high image quality display.

Seventh Exemplary Embodiment

A multi-projection display 700 (not shown) according to the seventh exemplary embodiment includes the solid-state light source control unit 176 (not shown) to control the amount of emitted light of the LED light sources 132R, 132G, and 132B for every projector unit 130 and for every liquid crystal device 134R, 134G or 134B, similar to the multi-projection display 600 according to the sixth exemplary embodiment. Further, the solid-state light source control unit 176 also has a function of dynamically controlling the amount of emitted light of the LED light sources 132R, 132G, and 132B for every projector unit 130.

The multi-projection display 700 according to the seventh exemplary embodiment includes the liquid crystal devices 134R, 134G, and 134B (not shown), which perform writing twice or more to one unit image information, as the liquid crystal device. Further, in the multi-projection display 700 according to the seventh exemplary embodiment, the solid-state light source control unit 176 has a function of allowing the solid-state light source to emit during one frame outside at least the first writing period of the liquid crystal devices 134R, 134G, and 134B.

Figure 22A:
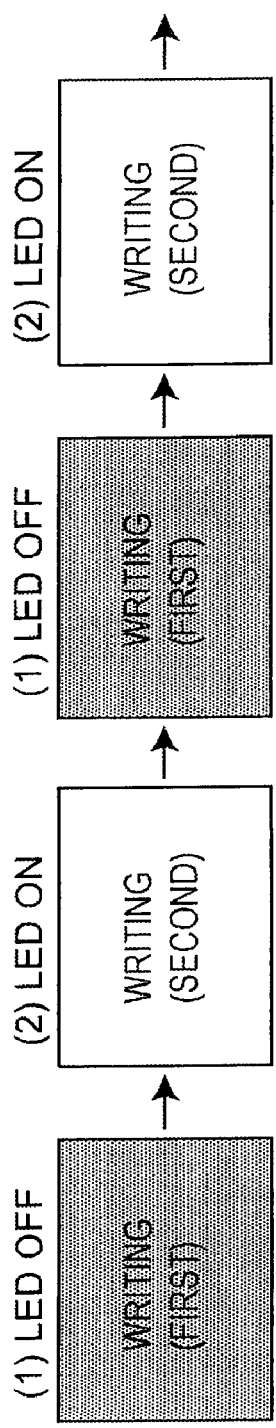
FIGS. 22A to 22C are schematics illustrating operations of the multi-projection display according to a seventh exemplary embodiment.
Figure 22B:
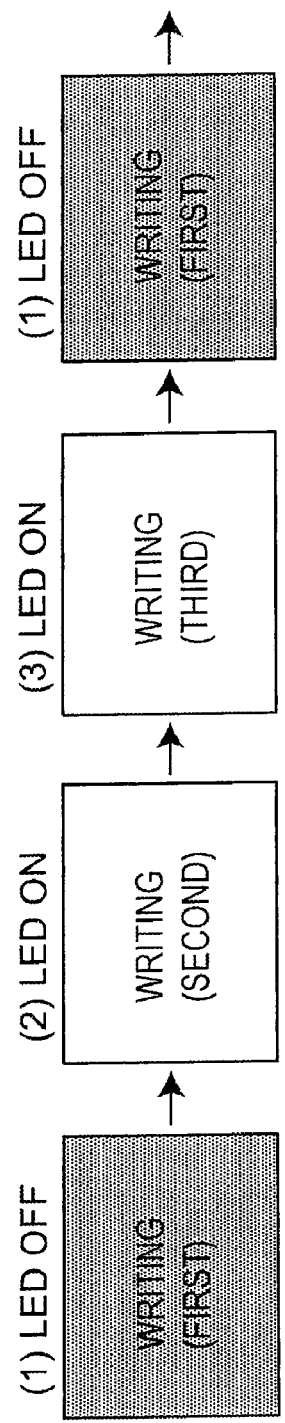
Figure 22C:
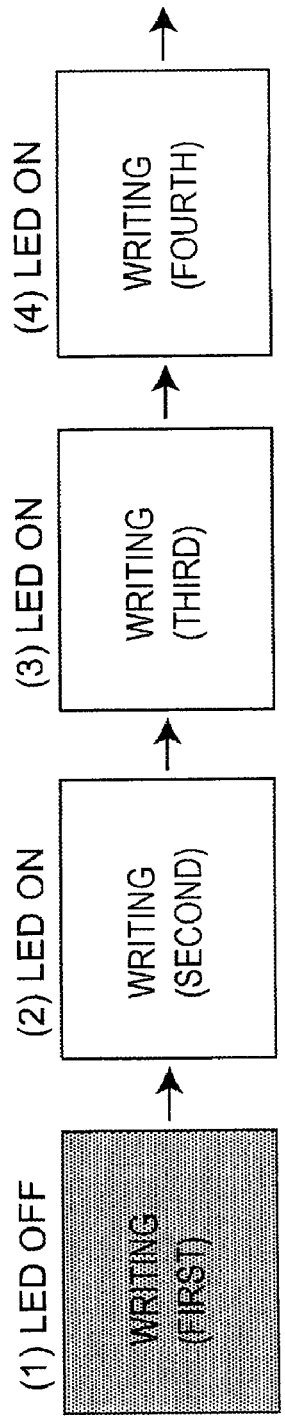

FIGS. 22A to 22C are schematics illustrating operations of the multi-projection display according to the seventh exemplary embodiment. FIG. 22A shows a two-time speed driving liquid crystal device, FIG. 22B shows a three-time speed driving liquid crystal device, and FIG. 22C shows a four-time speed driving liquid crystal device.

According to the multi-projection display 700 of the seventh exemplary embodiment, as shown in FIGS. 22A to 22C, writing is performed twice or more to one unit screen information, and a liquid crystal device of a so-called n-time speed driving (here, n is a natural number of 2 or more) is used. Further, the solid-state light source is allowed to emit outside at least the first writing period of the liquid crystal device. Thus, it becomes possible to project intermittently the projection images onto the screen. For this reason, it is possible to alleviate the tailing phenomenon which is a defect of the hold type display, and further it is possible to perform moving picture display smoothly with favorable quality.

Further, in the first writing period, since the liquid crystal molecules do not yet sufficiently respond, it is not easy to raise contrast of the liquid crystal device. However, according to the multi-projection display 700 of the seventh exemplary embodiment, since the solid-state light source is allowed to emit outside the first writing period, in the liquid crystal device and the multi-projection display, it has an advantage that it is possible to further enhance contrast.

Eighth Exemplary Embodiment

Figure 23A:
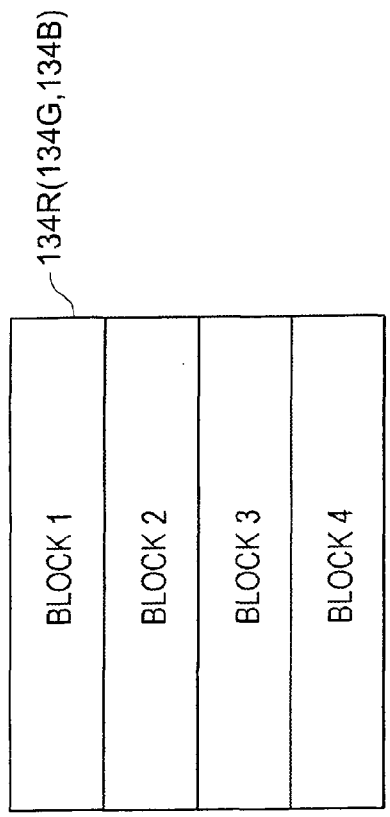
FIGS. 23A and 23B are schematics illustrating operations of the multi-projection display according to an eighth exemplary embodiment.
Figure 23B:
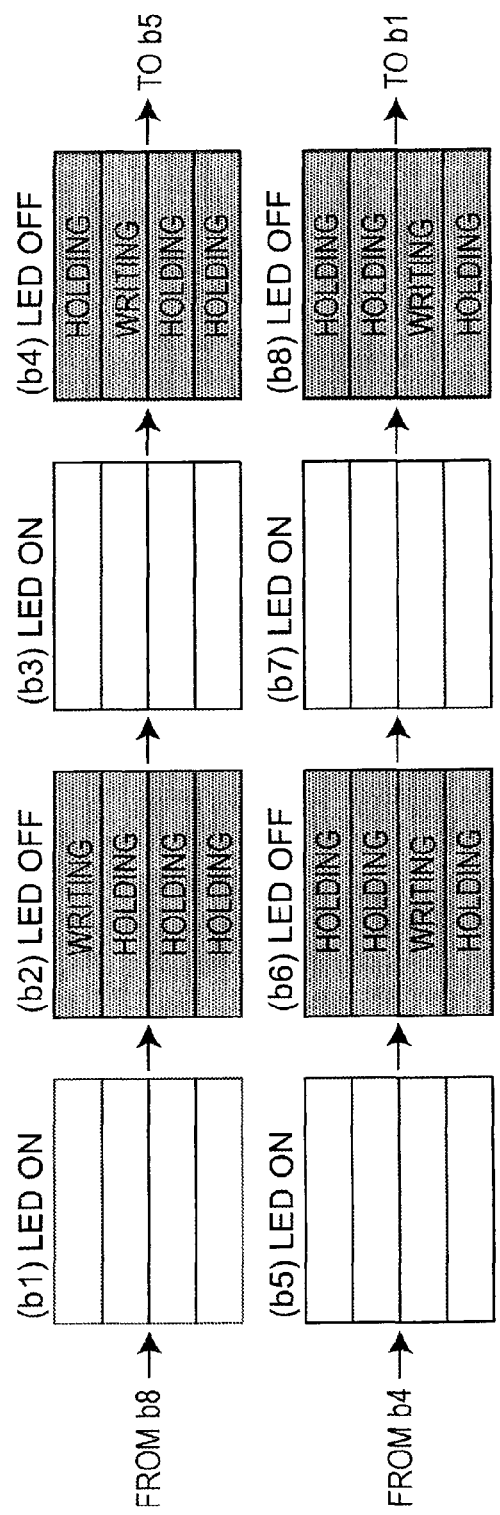

FIGS. 23A and 23B are schematics showing operations of a multi-projection display according to an eighth exemplary embodiment. The multi-projection display 800 (not shown) according to the eighth exemplary embodiment includes the solid-state light source control unit 178 (not shown) to control the amount of emitted light of the LED light sources 132R, 132G, and 132B for every projector unit 130 or for every liquid crystal device 134R, 134G or 134B, similarly to the multi-projection display 600 according to the sixth exemplary embodiment. Further, the solid-state light source control unit 178 has a function of dynamically controlling the amount of emitted light of the LED light sources 132R, 132G, and 132B for every projector unit 130.

The multi-projection display 800 according to the eighth exemplary embodiment includes the liquid crystal devices 134R, 134G, and 134B, which perform image writing sequentially for every screen region during one frame, as the liquid crystal device. Further, in the multi-projection display 800 according to the eighth exemplary embodiment, the solid-state light source control unit 178 has a function of allowing the LED light sources 132R, 132G, and 132B to emit during one frame outside the image writing periods of the liquid crystal devices 134R, 134G, and 134B.

For this reason, according to the multi-projection display 800 of the eighth exemplary embodiment, the LED light sources 132R, 132G, and 132B are allowed to emit outside the image writing periods of the liquid crystal devices 134R, 134G, and 134B. Thus, it has an advantage that it is possible to further improve contrast in the multi-projection display.

Ninth Exemplary Embodiment

Figure 24:
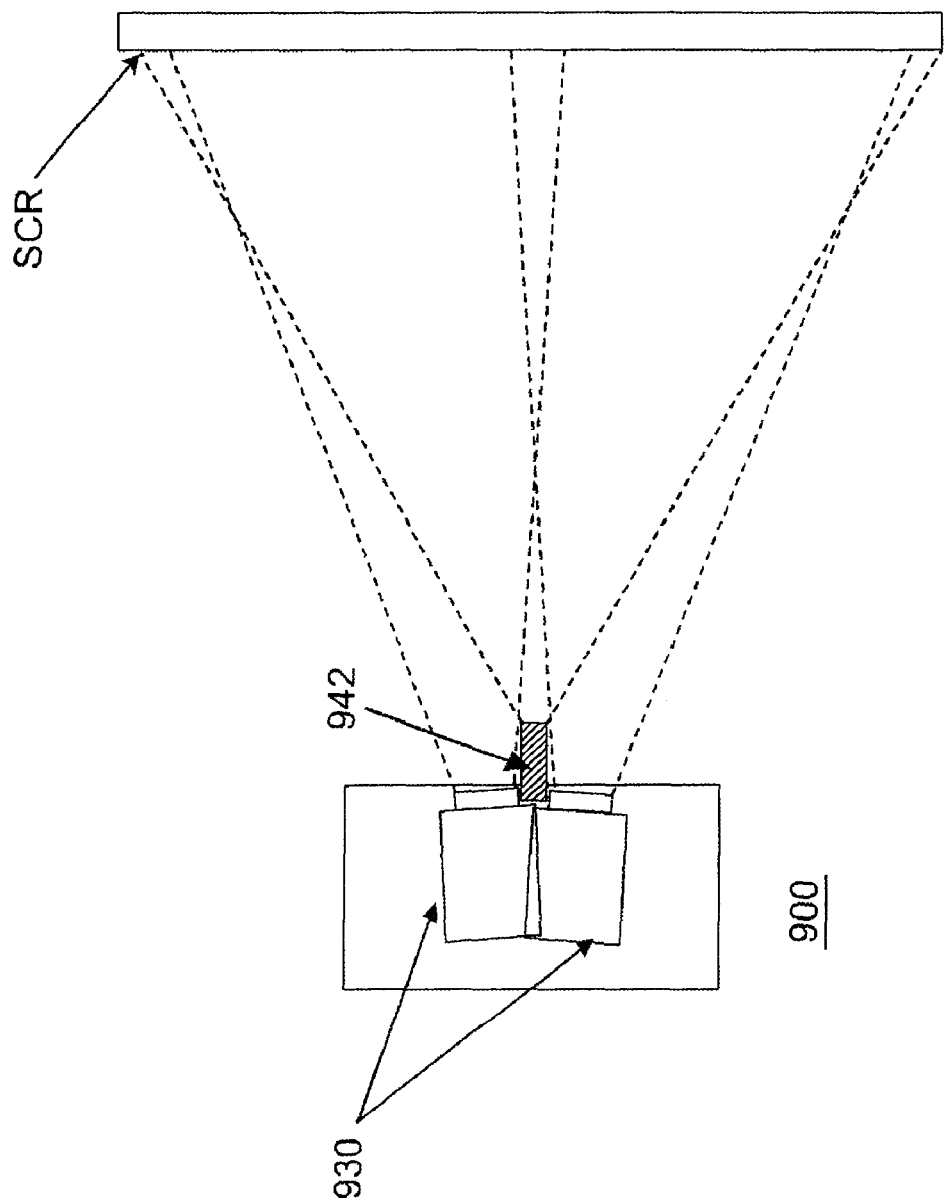
FIG. 24 is a schematic illustrating a construction of the multi-projection display according to a ninth exemplary embodiment.

FIG. 24 is a schematic showing a construction of a multi-projection display according to a ninth exemplary embodiment.

As shown in FIG. 24, the multi-projection display 900 according to the ninth exemplary embodiment is a front surface projection type multi-projection display. However, since the LED light sources (not shown) which can acquire the stable emitting state immediately after being turned on are used as the light source of the respective projector units 930, it is possible to obtain the same advantages as those of the multi-projection display 100 according to the first exemplary embodiment.

Tenth Exemplary Embodiment

Figure 25A:
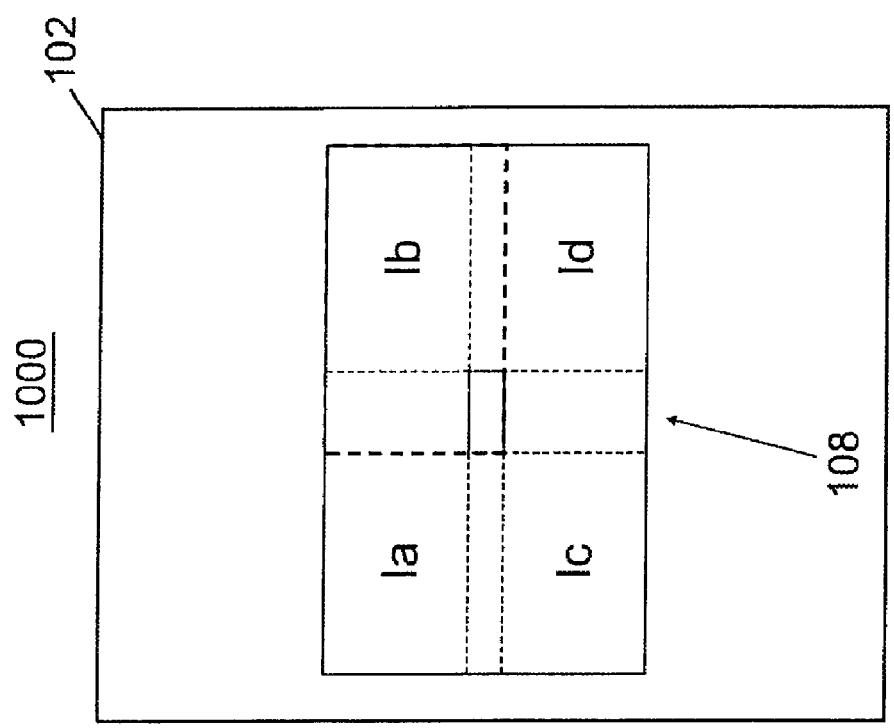
FIGS. 25A and 25B are schematics illustrating a construction of the multi-projection display according to a tenth exemplary embodiment.
Figure 25B:
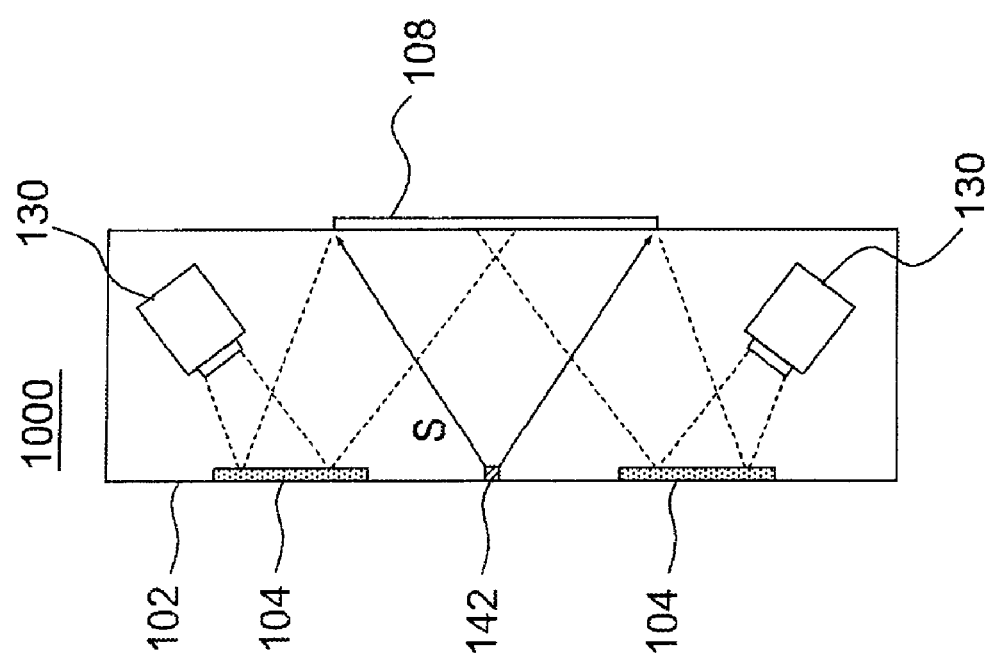

FIGS. 25A and 25B are schematics showing a construction of a multi-projection display according to a tenth exemplary embodiment. FIG. 25A is a cross-sectional view as viewed from a side, and FIG. 25B is a front view.

The multi-projection display 1000 according to the tenth exemplary embodiment has almost the same construction as that of the multi-projection display 100 according to the first exemplary embodiment, but, as shown in FIGS. 25A and 25B, it is different from the multi-projection display 100 according to the first exemplary embodiment in that the image-capturing element 142 in the image-capturing device is arranged in the housing 102 of the multi-projection display 1000.

For this reason, the multi-projection display 1000 of the tenth exemplary embodiment has the following advantages, in addition to the advantages in the multi-projection display 100 according to the first exemplary embodiment.

If the image-capturing device is arranged surely in the housing 102 of the multi-projection display 1000, there is no need to put the image-capturing device in order after the adjustment operation is completed. Thus, there is no need to set up the image-capturing device again every time the projection image is captured. As a result, the adjustment operation becomes easy and the adjustment time is also shortened.

Further, there are advantages that the image-capturing element 142 can be easily set up at an accurate position to the transmissive screen 108, and the capturing of the projection image can be performed accurately and easily.

In addition, there are advantages that the overall control unit for processing the capturing result can be easily housed in the housing 102 and the multi-projection display 1000 can be easily moved and set up.

The multi-projection display of exemplary aspects of the present invention is described based on the above-mentioned respective exemplary embodiments. But the present invention is not limited to the above-mentioned respective exemplary embodiments, and it may be realized in various aspects within a scope without departing from the subject matter of the present invention. For example, the following modifications are possible.

(1) The multi-projection displays 100 to 1000 of the above-mentioned respective exemplary embodiments use the LED light source as the solid-state light source, but the present invention is not limited to the LED light source, for example. Instead of the LED light source, for example, a semiconductor laser light source, a solid-state laser light source, or an EL light source may be used.

Even in the case of using these solid-state light sources, it is easy to adjust since the stable emitting state is acquired at once. Further, it is possible to obtain the multi-projection display having sufficient brightness and color-rendering property.

(2) The multi-projection displays 100 to 1000 of the above-mentioned respective exemplary embodiments use a transmissive liquid crystal device as the electro-optical modulating device. But the present invention is not limited to the transmissive liquid crystal device. Instead of the transmissive liquid crystal device, for example, a reflective liquid crystal device or a micromirror type optical modulating device may be used.

Even in the case of using these electro-optical modulating devices, similarly, it is possible to obtain the above-mentioned advantages of the present invention.

What is claimed is:
1. A multi-projection display comprising:
a plurality of projector units that modulate light from a solid-state light source based on image information;
a unit image information generating unit that generates unit image information to be input to each of the plurality of projector units;
an image-capturing device that captures projection images projected onto a screen by the projector units, the image-capturing device, during an adjustment operation, simultaneously capturing projection images projected by two projector units of the plurality of projector units, the projection images being adjacent to each other, while each of the solid-state light sources of other projector units are turned off; and a unit image information correcting unit that corrects the unit image information based on each projection image captured by the image-capturing device, the adjustment operation modifying the projection images.

2. The multi-projection display according to claim 1, the solid-state light source being at least one of an LED light source, a semiconductor laser light source, a solid-state laser light source, and an EL light source.

3. The multi-projection display according to claim 1, the unit image information correcting unit correcting at least one of shapes, positions and inclinations of the unit image information to be projected by the projector units.

4. The multi-projection display according to claim 1, the unit image information correcting unit correcting at least one of brightness and colors of the unit image information to be projected by the projector units.

5. The multi-projection display according to claim 1, the unit image information correcting unit having a function of correcting brightness and/or color for every pixel in the plurality of projector units.

6. The multi-projection display according to claim 1, the unit image information correcting unit correcting the unit image information using correction parameters that are determined based on the captured projection images.

7. The multi-projection display according to claim 6, further comprising:

a correction parameter storing unit that stores the correction parameters.

8. The multi-projection display according to claim 6, further comprising:

a correction parameter automatic acquiring device that captures, during the adjustment operation, an adjusting image in certain circumstances to acquire the correction parameters, the correction parameter automatic acquiring device operating automatically at predetermined times or after elapse of predetermined time periods.

9. The multi-projection display according to claim 1, further comprising:

an optical correcting device that corrects at least one of a position and orientation of an optical element provided in the multi-projection display.

10. The multi-projection display according to claim 9, further comprising:

an optical element automatic correcting device that captures an adjusting image in certain circumstances to automatically correct the at least one of the position and orientation of the optical element, the optical element automatic correcting device operating automatically at predetermined times or after elapse of predetermined time periods.

11. The multi-projection display according to claim 1, further comprising:

a solid-state light source control unit that controls an amount of light emitted from the solid-state light source separately for every projector unit.

12. The multi-projection display according to claim 1, the multi-projection display being a rear surface projection type multi-projection display which further comprises a transmissive screen that projects the projection images from the plurality of projector units.

13. The multi-projection display according to claim 1, the multi-projection display being a front surface projection type multi-projection display which projects the projection images from the projector units onto a front surface thereof.

14. The multi-projection display according to claim 1, the unit image information correcting unit adding a weight function taking γ correction into consideration to a pixel value of the unit image information in an overlapped region.

15. The multi-projection display according to claim 1, the unit image information correcting unit correcting at least one of shapes, positions and inclinations of the unit image information, and subsequently correcting at least one of brightness colors of the unit image information.

16. The multi-projection display according to claim 1, each of the projector units comprising an optical correcting device that corrects an orientation of an optical element provided in the multi-projection display.

* * * * *